(12) United States Patent
Suzuki

(10) Patent No.: US 12,184,209 B2
(45) Date of Patent: Dec. 31, 2024

(54) MOTOR CONTROL DEVICE AND STEERING SYSTEM

(71) Applicant: DENSO CORPORATION, Kariya (JP)

(72) Inventor: Takashi Suzuki, Kariya (JP)

(73) Assignee: DENSO CORPORATION, Kariya (JP)

(*) Notice: Subject to any disclaimer, the term of this patent is extended or adjusted under 35 U.S.C. 154(b) by 196 days.

(21) Appl. No.: 18/065,470

(22) Filed: Dec. 13, 2022

(65) Prior Publication Data

US 2023/0116678 A1 Apr. 13, 2023

Related U.S. Application Data

(63) Continuation of application No. PCT/JP2021/021534, filed on Jun. 7, 2021.

(30) Foreign Application Priority Data

Jun. 17, 2020 (JP) ................... 2020-104409

(51) Int. Cl.
*H02P 21/22* (2016.01)
*B62D 5/04* (2006.01)
*H02P 21/00* (2016.01)
*H02P 25/22* (2006.01)
*H02P 27/12* (2006.01)

(52) U.S. Cl.
CPC ............ *H02P 21/22* (2016.02); *B62D 5/0409* (2013.01); *H02P 21/0089* (2013.01); *H02P 25/22* (2013.01); *H02P 27/12* (2013.01)

(58) Field of Classification Search
CPC ...... H02P 21/22; H02P 21/0089; H02P 25/22; H02P 27/12; B62D 5/0409
USPC .......................................... 318/496
See application file for complete search history.

(56) References Cited

U.S. PATENT DOCUMENTS

| 9,350,286 | B2* | 5/2016 | Satou ................. H02P 25/22 |
| 2019/0363664 | A1 | 11/2019 | Nakamura |
| 2020/0136543 | A1* | 4/2020 | Kawamura .......... B62D 5/0409 |
| 2022/0200508 | A1* | 6/2022 | Saha ................... H02P 21/22 |

FOREIGN PATENT DOCUMENTS

| CN | 106357196 A | * | 1/2017 | ............... B62D 5/04 |
| JP | H09-149700 A | | 6/1997 | |

* cited by examiner

*Primary Examiner* — Jorge L Carrasquillo
(74) *Attorney, Agent, or Firm* — MASCHOFF BRENNAN

(57) ABSTRACT

A motor control device for a motor including first and second winding sets, includes: first and second inverters; and a control unit that controls the first and second inverters by differentiating a magnitude of current flowing through the first winding set and a magnitude of current flowing through the second winding set, or by restricting an output voltage of the second inverter so as to reduce a first output voltage from the first inverter to the first winding set when the first output voltage is higher than a first upper limit voltage.

20 Claims, 18 Drawing Sheets

MOTOR CONTROL DEVICE AND STEERING SYSTEM

CROSS REFERENCE TO RELATED APPLICATION

The present application is a continuation application of International Patent Application No. PCT/JP2021/021534 filed on Jun. 7, 2021, which designated the U.S. and claims the benefit of priority from Japanese Patent Application No. 2020-104409 filed on Jun. 17, 2020. The entire disclosures of all of the above applications are incorporated herein by reference.

TECHNICAL FIELD

The present disclosure relates to a motor control device that controls a motor.

BACKGROUND

Conventionally, in a motor control device for controlling a motor having two winding sets, a motor control device having a power supply and an inverter for each winding set is suggested.

SUMMARY

According to an example, a motor control device for a motor including first and second winding sets, includes: first and second inverters; and a control unit that controls the first and second inverters by differentiating a magnitude of current flowing through the first winding set and a magnitude of current flowing through the second winding set, or by restricting an output voltage of the second inverter so as to reduce a first output voltage from the first inverter to the first winding set when the first output voltage is higher than a first upper limit voltage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
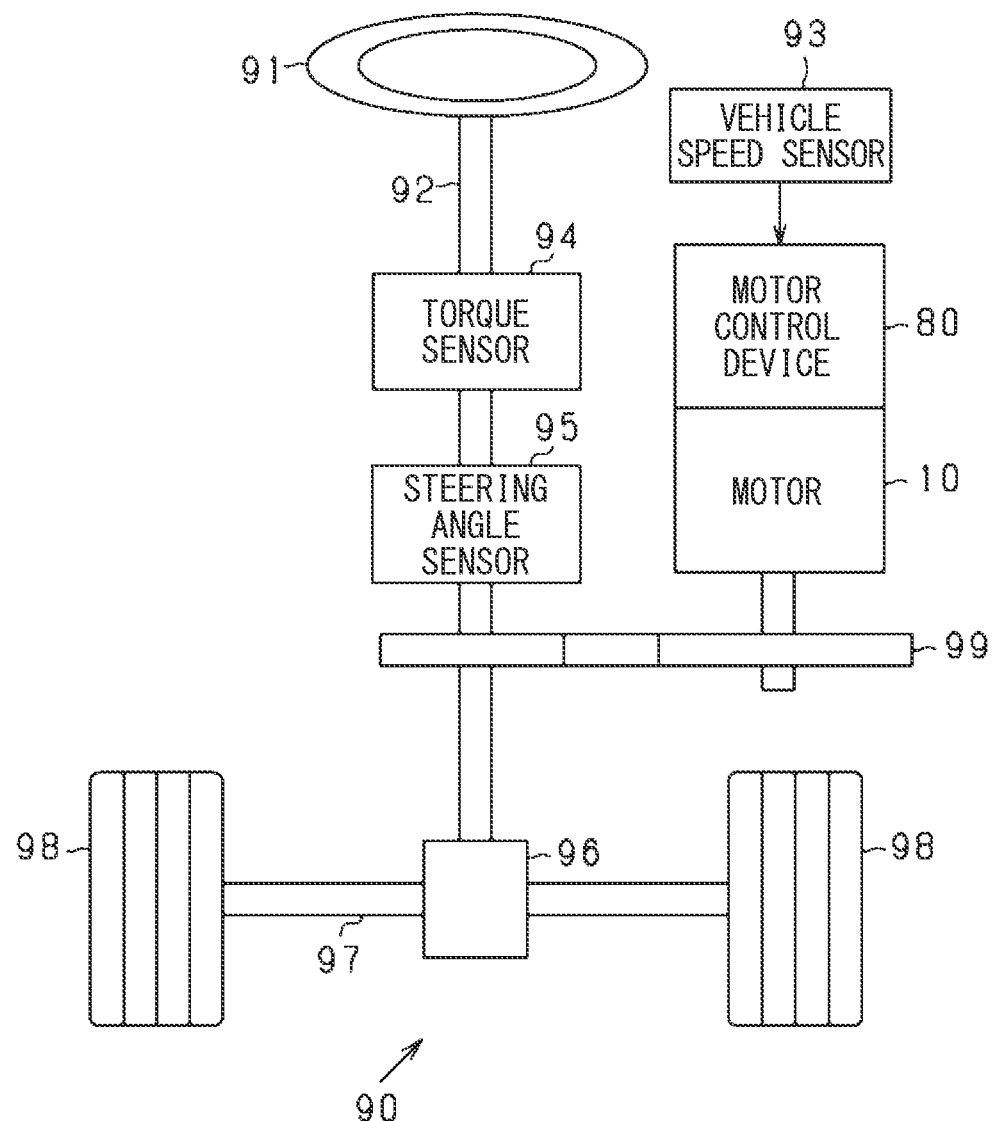
FIG. 1 is a schematic diagram showing a steering system.

Here, in the motor control device according to a conceivable technique, when the maximum output voltages that the two inverters can output to each winding set are different from each other, or the back electromotive forces of the two winding sets is different due to different turns, and the like, the request voltage may be higher than the maximum output voltage in a system having the winding set with a higher voltage or having the inverter with the lower maximum output voltage. In that case, the motor may not be controlled according to an instruction.

The present embodiments have been made to solve the above difficulties, and the main purpose thereof is to prevent the motor from being out of control according to an instruction even when the maximum output voltages that the two inverters can output to each winding set are different from each other, or the voltages of the two winding sets are different from each other.

A first aspect to address the above-mentioned issue is a motor control device, which controls a motor including a first winding set and a second winding set, includes:
 a first inverter connected to the first winding set and supplied with electric power from a first power supply unit;
 a second inverter connected to the second winding set and supplied with electric power from a second power supply unit; and
 a control unit that controls the first inverter and the second inverter by differentiating a magnitude of current flowing through the first winding set and a magnitude of current flowing through the second winding set, or by restricting an output voltage of the second inverter, so as to reduce a first output voltage as a voltage to be output from the first inverter to the first winding set when the voltage to be output from the first inverter is higher than a first upper limit voltage determined based on a first maximum output voltage.

According to the above configuration, the motor control device controls the motor including the first winding set and the second winding set. The first inverter is connected to the first winding set and supplied with electric power from a first power supply unit. The second inverter is connected to the second winding set and supplied with electric power from a second power supply unit.

Here, the first maximum output voltage, which is the maximum output voltage that the first inverter can output to the first winding set, may be lower than the second maximum output voltage, which is the maximum output voltage that the second inverter can output to the second winding set. In that case, even if the request voltage required for an output from the second inverter is equal to or lower than the second maximum output voltage, the request voltage required for an output from the first inverter may become higher than the first maximum output voltage, and the motor control may not be performed according to an instruction. The first power supply unit and the second power supply unit may be independent power sources or may be a power supply unit branched from a common power source. Even if the first power supply unit and the second power supply unit are branched from a common power supply, the maximum output voltages that can be output from the first inverter and the second inverter may be different from each other due to differences in wiring resistance and the like.

The control unit controls the first inverter and the second inverter by differentiating a magnitude of current flowing through the first winding set and a magnitude of current flowing through the second winding set, or by restricting an output voltage of the second inverter, so as to reduce a first output voltage as a voltage to be output from the first inverter to the first winding set when the voltage to be output from the first inverter is higher than a first upper limit voltage determined based on a first maximum output voltage. Therefore, it is possible to prevent the voltage required in the first inverter from becoming higher than the first maximum output voltage, and it is possible to suppress that the motor cannot be controlled according to an instruction.

In the second means, the control unit includes: a first control unit that controls the first inverter based on the first request voltage when the first request voltage, which is the request value of the voltage to be output by the first inverter, is not higher than the first upper limit voltage set based on the first maximum output voltage, and controls the first inverter to reduce the first request voltage when the first request voltage is higher than the first upper limit voltage; and a second control unit that controls the second inverter based on the second request voltage, which is a required value of the voltage output by the second inverter.

According to the above configuration, the first control unit controls the first inverter based on the first request voltage when the first request voltage is not higher than the first upper limit voltage set based on the first maximum output voltage. The second control unit controls the second inverter based on the second request voltage. On the other hand, the first control unit controls the first inverter so as to lower the first request voltage when the first request voltage is higher than the first upper limit voltage. Therefore, it is possible to prevent the voltage required in the first inverter from becoming higher than the first maximum output voltage, and it is possible to suppress that the motor cannot be controlled according to an instruction.

In the third means, the first control unit: calculates the first request voltage based on the command value that instructs a command of the torque to be output to the motor; controls the first inverter based on the first request voltage when the first request voltage is not higher than the first upper limit voltage set to be equal to or lower than the first maximum output voltage; and controls the first inverter so as to lower the first request voltage when the first request voltage is higher than the first upper limit voltage. The second control unit: calculates the second request voltage, which is the required value of the voltage output by the second inverter, based on the command value; and controls the second inverter based on the second request voltage.

According to the above configuration, the first control unit controls the first inverter based on the first request voltage when the first request voltage is not higher than the first upper limit voltage set to be equal to or lower than the first maximum output voltage. The second control unit controls the second inverter based on the second request voltage. Since both the first request voltage and the second request voltage are calculated based on the above command values, the torque generated by the current flowing in the first winding set and the torque generated by the current flowing in the second winding set can be harmonized. On the other hand, the first control unit controls the first inverter so as to lower the first request voltage when the first request voltage is higher than the first upper limit voltage. Therefore, it is possible to prevent the voltage required in the first inverter from becoming higher than the first maximum output voltage, and it is possible to suppress that the motor cannot be controlled according to an instruction.

In the fourth means, when the first request voltage, which is the required value of the voltage output by the first inverter, is higher than the first upper limit voltage, the control unit controls the first inverter so as to reduce the q-axis current of the first winding set. According to such a configuration, by reducing the q-axis current of the first winding set, it is possible to prevent the voltage required in the first inverter from becoming higher than the first maximum output voltage.

In the fifth means, the control unit: calculates the first d-axis current command for instructing the command of the d-axis current of the first winding set and the first q-axis current command for instructing the command of the q-axis current of the first winding set based on the command value that instructs the command for the torque to be output to the motor; calculates the first request voltage, which is the required value of the voltage to be output by the first inverter, based on the first d-axis current command and the first q-axis current command; and controls the first inverter so as to reduce the absolute value of the first q-axis current command when the first request voltage is higher than the first upper limit voltage.

According to the above configuration, the control unit calculates the first d-axis current command and the first q-axis current command of the first winding set based on the command value, and calculates the first request voltage based on the first d-axis current command and the first q-axis current command. Therefore, the motor can be controlled based on the first d-axis current command and the first q-axis current command. Here, the first d-axis current command may not be limited to the command value of the first d-axis current, and may be any value that correlates with the first d-axis current. The first q-axis current command may not be limited to the command value of the first q-axis current, and may be any value that correlates with the first q-axis current.

Here, in the motor including the first winding set and the second winding set, the voltage equations of the following equations (1) and (2) are established.

$$Vd1 = R \times Id1 - \omega \times L \times Iq1 - \omega \times M \times Iq2 \quad (1)$$

$$Vq1 = R \times Iq1 + \omega \times L \times Id1 + \omega \times M \times Id2 + \omega \times K \quad (2)$$

In equation (1), Vd1 is the d-axis voltage of the first winding set, R is the resistance of the first winding set, Id1 is the d-axis current of the first winding set, ω is the angular speed of the motor, and L is the self-inductance of the first winding set, Iq1 is the q-axis current of the first winding set, M is the mutual inductance between the first winding set and the second winding set, and Iq2 is the q-axis current of the second winding set. In the equation (2), Vq1 is the q-axis voltage of the first winding set, Id2 is the d-axis current of the second winding set, and K is the back electromotive force constant of the first winding set. In order to control Id1, Iq1, Id2, and Iq2 to be the first axis current command, the first q axis current command, the second d axis current command, and the second q axis current command, respectively, √(Vd1^2+Vq1^2) (i.e., a square root of (Vd1^2+Vq1^2)) corresponding to the amplitude of the voltage required needs to be less than or equal to the maximum output voltage. "Vd1^2" represents the square of Vd1.

Then, the control unit controls the first inverter so as to reduce the absolute value of the first q-axis current command when the first request voltage is higher than the first upper limit voltage. Therefore, in the above equation (2), by reducing the first q-axis current command as the q-axis current Iq1 of the first winding set, "R×Iq1" and eventually the q-axis voltage Vq1 of the first winding set is lowered. Therefore, the first request voltage √ (=Vd1^2+Vq1^2) calculated based on the first d-axis current command and the first q-axis current command can be reduced.

When the first q-axis current command is reduced, the motor may not be able to output the torque of the command value.

In this respect, in the sixth means, the control unit calculates the second d-axis current command for instructing the d-axis current of the second winding set and the second q-axis current command for instructing the q-axis current of the second winding set based on the command value that commands the torque to be output to the motor, and controls the second inverter so as to increase the second q-axis current command based on the amount of decrease in which the q-axis current of the first winding set is reduced. According to such a configuration, the decrease in the torque of the motor due to the decrease in the first q-axis current command can be compensated for by the increase in the torque of the motor due to the increase in the second q-axis current command. Therefore, it is possible to prevent the torque output by the motor from being reduced below the command value.

In the seventh means, the control unit: calculates the first d-axis current command for instructing the d-axis current of the first winding set or the first q-axis current command for instructing the q-axis current of the first winding set based on a command value that commands the torque to be output to the motor; calculates the first request voltage, which is the required value of the voltage to be output by the first inverter, based on the first d-axis current command and the first q-axis current command; and controls the first inverter so as to reduce the back electromotive force of the first winding set when the first request voltage is higher than the first upper limit voltage.

According to the above configuration, the control unit controls the first inverter so as to reduce the back electromotive force of the first winding set when the first request voltage is higher than the first limit voltage. Therefore, the first d-axis current command is corrected so as to reduce the back electromotive force of the first winding set, that is, the first d-axis current command as the d-axis current Id1 of the first winding set in the above equation (2) is set to be negative, so that the q-axis voltage Vq1 of the first winding set can be lowered.

In the eighth means, the control unit: calculates a second d-axis current command for commanding the d-axis current of the second winding set and a second q-axis current command for commanding the q-axis current of the second winding set based on the command value; controls the second inverter so as to reduce the back electromotive force of the second winding set when the first d-axis current command reaches the first d-axis limit value; and controls the first inverter based on the second d-axis current command, the first d-axis limit value, and the first q-axis current command when the first d-axis current command reaches the first d-axis limit value.

The first d-axis current command corrected to reduce the back electromotive force of the first winding set is generally set so as not to exceed the first d-axis limit value. Even when the first d-axis current command reaches the first d-axis limit value, there is a possibility such that the voltage required based on the first d-axis current command and the first q axis current command may be higher than the first maximum output voltage.

In this regard, according to the above configuration, the control unit controls the first inverter based on the second d-axis current command, the first d-axis limit value, and the first q-axis current command, which are corrected so as to reduce the back electromotive force of the second winding set when the first d-axis current command reaches the first d-axis limit value. Therefore, the second d-axis current command is corrected so as to reduce the back electromotive force of the second winding set, that is, the second d-axis current command as the d-axis current Id2 of the second winding set in the above equation (2) is set to be negative, so that the q-axis voltage Vq1 of the first winding set can be lowered.

In the ninth means, the first winding set and the second winding set are distribution-wound. The control unit: calculates a second d-axis current command for commanding the d-axis current of the second winding set and a second q-axis current command for commanding the q-axis current of the second winding set based on the command value; controls the second inverter so as to increase the back electromotive force of the second winding set by the first d-axis excess amount by which the first d-axis current command exceeds the first d-axis limit value when the first d-axis current command exceeds the first d-axis limit value; and controls the first inverter based on the second d-axis current command, the first d-axis current command, and the first q-axis current command when the first d-axis current command exceeds the first d-axis limit value.

In the motor, when the first winding set and the second winding set are distribution-wound, even if the first d-axis current command exceeds the first d-axis limit value, it is possible to cancel the situation by correcting the second d-axis current command to increase the back electromotive force of the second winding set.

In this regard, according to the above configuration, when the first axis current command exceeds the first axis limit value, the control unit controls the first inverter so as to increase the back electromotive force of the second winding set only by the first d-axis excess amount by which the first d-axis current command exceeds the first d-axis limit value. Therefore, while lowering the q-axis voltage Vq1 of the first winding set, the first d-axis excess amount in which the first d-axis current command exceeds the first d-axis limit value can be cancelled by the second d-axis current command.

In the motor, when the first winding set and the second winding set are distribution-winding, there is a possibility such that the magnetic parts of the motor may deteriorate if the total of the first d-axis correction amount, which is the correction amount obtained by correcting the first d-axis current command so as to reduce the back electromotive force of the first winding set, and the second d-axis correction amount, which is the correction amount obtained by correcting the second d-axis current command so as to reduce the back electromotive force of the second winding set, becomes excessive.

In the tenth means, the first winding set and the second winding set are distribution-wound. The control unit controls the first inverter to set the total of the first d-axis correction amount, which is the correction amount obtained by correcting the first d-axis current command so as to reduce the back electromotive force of the first winding set, and the second d-axis correction amount, which is the correction amount obtained by correcting the second d-axis current command so as to reduce the back electromotive force of the second winding set, to be equal to or lower than the predetermined d-axis correction amount. Therefore, the total of the first d-axis correction amount and the second d-axis correction amount can be set to be equal to or lower than a predetermined d-axis correction amount, and deterioration of the magnetic parts of the motor can be suppressed.

As described above, when the first d-axis current command is corrected so as to reduce the back electromotive force of the first winding set, the first d-axis current command as the first d-axis current Id1 of the first winding set in the above equation (1) becomes negative. In this case, if the first q-axis current command as the q-axis current Iq1 of the first winding set is positive, both the value of "R×Id1" and the value of "(−ω×L×Iq1)" become negative, and there is a possibility such that the absolute value of the d-axis voltage Vd1 of the first winding set may be large.

In this respect, in the eleventh means, the control unit controls the first inverter so as to set the positive/negative sign of the first q-axis current command for instructing the q-axis current of the first winding set to be opposite to the positive/negative sign of the command value that commands the torque to be output to the motor under a condition that the voltage to be output by the first inverter is higher than the first upper limit voltage set based on the first maximum output voltage. Therefore, since the value of "R×Id1" can be made negative and the value of "(−ω×L×Iq1)" can be made positive, the absolute value of the d-axis voltage Vd1 of the first winding set can be reduced, and eventually the first request voltage can be lowered.

The larger the first voltage excess amount in which the first request voltage exceeds the first upper limit voltage, the more likely it is that the motor cannot be controlled according to an instruction.

In this regard, in the twelfth means, the control unit controls the first inverter so as to more reduce the first request voltage as the first voltage excess amount in which the first request voltage, which is the required value of the voltage to be output by the first inverter, exceeds the first upper limit voltage becomes larger. According to such a configuration, the larger the first voltage excess amount in which the first request voltage exceeds the first upper limit voltage, the faster the first request voltage can be lowered.

If the situation continues such that the first request voltage exceeds the first upper limit voltage, a not-required current may continue to flow in the winding set.

In this regard, in the thirteenth means, the control unit controls the first inverter so that the larger the integrated value of the first voltage excess amount, the lower the first request voltage. According to such a configuration, the longer the state in which the first request voltage exceeds the first upper limit voltage continues, the lower the first request voltage is, so that the state in which the first request voltage exceeds the first upper limit voltage is easily eliminated.

In the fourteenth means, the control unit controls the first inverter so as to reduce the first request voltage, which is the required value of the voltage to be output by the first inverter to be lower than the second request voltage, which is the required value of the voltage to be output by the second inverter when the first maximum output voltage is lower than the second maximum output voltage, which is the maximum output voltage that the second inverter can output to the second winding set. Even with such a configuration, it is possible to prevent the voltage required for the first inverter from becoming higher than the first maximum output voltage, and it is possible to prevent the current from becoming uncontrollable and preventing a not-required current from flowing through the winding set.

In the fifteenth means, the control unit: calculates the first request voltage, which is a required value of a voltage to be output by the first inverter, and the second request voltage, which is a required value of a voltage to be output by the second inverter, based on the command value which commands a torque to be output to the motor; calculates the first request voltage to be lower than the second request voltage when the first maximum output voltage is lower than the second maximum output voltage; and controls the first inverter based on the first request voltage, and controls the second inverter based on the second request voltage. Even with the above configuration, the same effect as that of the fourteenth means can be obtained.

In the sixteenth means, the control unit: calculates a first d-axis current command for commanding the d-axis current and a first q-axis current command for commanding the q-axis current in the first winding set, and calculates a second d-axis current command for commanding the d-axis current and a second q-axis current command for commanding the q-axis current in the second winding set, according to the command value; calculates the first request voltage based on the first d-axis current command and the first q-axis current command; calculates the second request voltage based on the second d-axis current command and the second q-axis current command; and calculates the first q-axis current command to be smaller than the second q-axis current command when the first maximum output voltage is lower than the second maximum output voltage.

According to the above configuration, the control unit calculates the first d-axis current command and the first q-axis current command, and the second d-axis current command and the second q-axis current command based on the command value of the torque, and calculates the first request voltage based on the first d-axis current command and the first q-axis current command, and calculates the second request voltage based on the second d-axis current command and the second q-axis current command. Then, when the first maximum output voltage is lower than the second maximum output voltage, the control unit calculates the first q-axis current command to be smaller than the second q-axis current command. Therefore, the first request voltage can be made lower than the second request voltage, and it is possible to prevent the first request voltage from becoming higher than the first maximum output voltage. Therefore, it is possible to prevent the motor from being out of control according to an instruction.

In the seventeenth means, the control unit: calculates the first d-axis current command so as to reduce the back electromotive force of the first winding set based on the larger one of the integrated value of the first voltage excess amount in which the first request voltage exceeds the first upper limit voltage set to be equal to or lower than the first maximum output voltage, and the integrated value of the second voltage excess amount in which the second request voltage exceeds the second upper limit voltage set to be equal to or lower than the second maximum output voltage; and calculates the second d-axis current command so as to reduce the back electromotive force of the second winding set.

According to the above configuration, the first d-axis current command and the second d-axis current command are corrected so as to reduce the back electromotive force of the first winding set and the second winding set, that is, the first d-axis current command and the second d-axis current command in the above equation (2) are made negative, so that the q-axis voltage Vq1 of the first winding set and the q-axis voltage Vq2 of the second winding set can be lowered. Further, the first d-axis current command and the second d-axis current command are corrected based on the larger one of the integrated value of the first voltage excess amount in which the first upper limit voltage exceeds the first request voltage and the integrated value of the second voltage excess amount in which the second upper limit voltage exceeds the second request voltage. Therefore, it is possible to prevent the required voltage from becoming higher than the maximum output voltage in both inverters.

Specifically, as in the eighteenth means, restriction of the output voltage means limiting the output voltage to a predetermined absolute value or less.

Further, specifically, as in the 19th means, it is possible to adopt a configuration such as that the limiting the output voltage means stopping the integral operation in the control based on the deviation between the command value and the actual value of the current flowing in the second winding set.

The twentieth means is a steering system, and includes the motor control device according to any one of the first to nineteenth means, a steering mechanism, and the motor for driving the steering mechanism.

According to the above configuration, in a steering system including a motor control device, a steering mechanism, and a motor for driving the steering mechanism, the same operation and effect as any one of the first to nineteenth means can be obtained.

First Embodiment

Hereinafter, the first embodiment embodied in the steering system mounted on the vehicle will be described with reference to the drawings.

As shown in FIG. 1, the steering system 90 includes a steering wheel 91, a steering shaft 92, a pinion gear 96, a rack shaft 97, wheels 98, a motor 10, a motor control device 80, a reduction gear 99, and the like, which are steering members.

The steering wheel 91 is connected to the steering shaft 92. The steering shaft 92 is provided with a torque sensor 94 and a steering angle sensor 95. The torque sensor 94 detects the steering torque Ts accompanying the operation of the steering wheel 91 by the driver. The steering angle sensor 95 detects the operating angle of the steering wheel 91 by the driver and the steering speed Vs. The pinion gear 96 is provided at a tip of the steering shaft 92. The pinion gear 96 engages with the rack shaft 97. A pair of road wheels 98 is connected to both ends of the rack shaft 97 via tie rods or the like. The motor 10, the motor control device 80, the torque sensor 94, and the steering angle sensor 95 constitute an electric power steering device.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to a displacement amount of the rack shaft 97.

The reduction gear 99 decelerates the rotation of the motor 10 at a predetermined reduction ratio and transmits it to the steering shaft 92. The motor 10 is a so-called steering control assist motor. The motor control device 80 and the motor 10 are integrally configured, and form a so-called mechanical/electrical integrated drive device. The steering mechanism includes a steering shaft 92, a reduction gear 99, a pinion gear 96, and a rack shaft 97.

Figure 2:
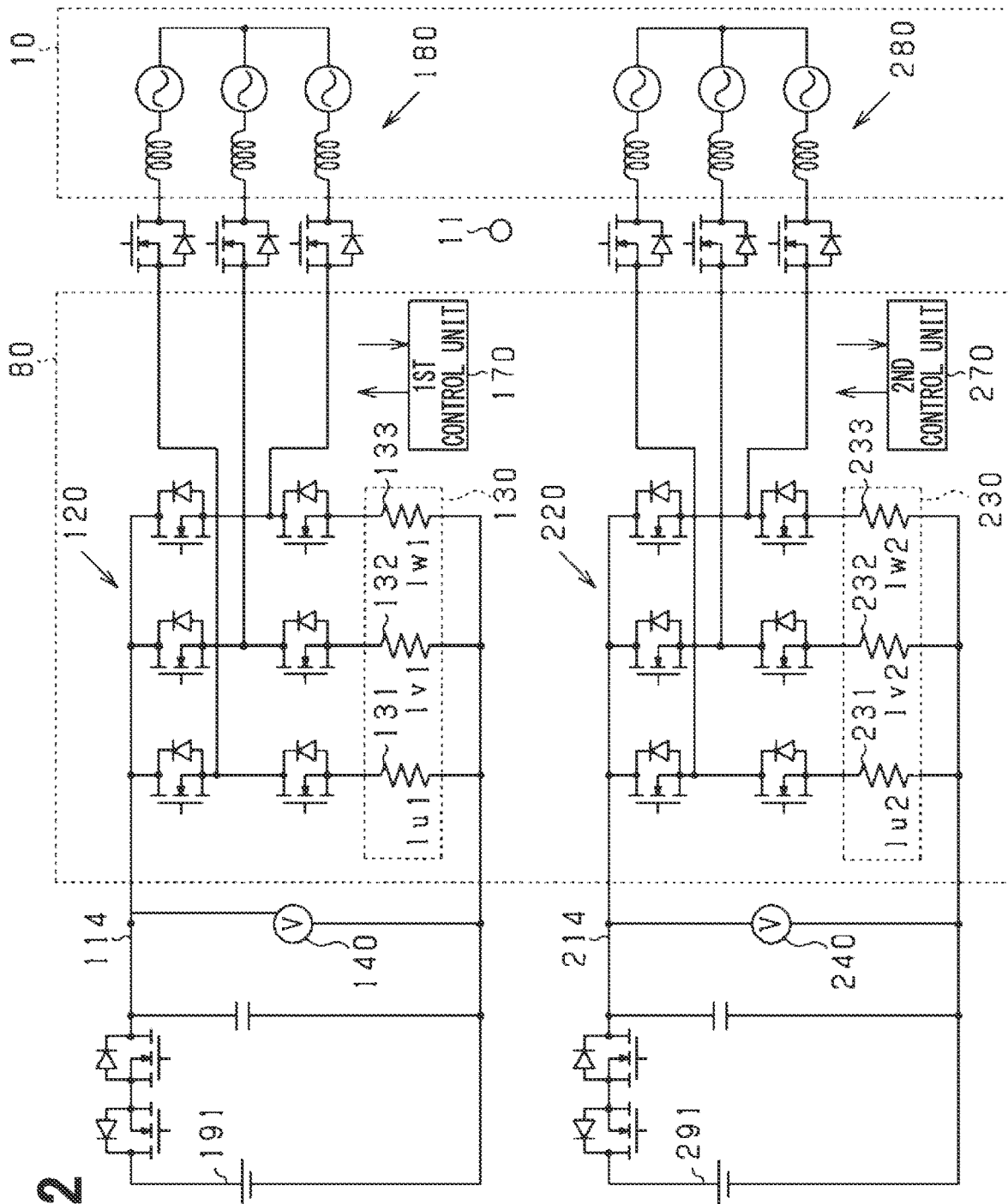
FIG. 2 is an electrical circuit diagram showing a power supply, a motor control device, and a motor.

The motor 10 outputs assist torque for assisting steering of the steering wheel 91 performed by a driver. As shown in FIG. 2, the motor 10 is driven by being supplied with electric power from the first power supply 191 and the second power supply 291 to rotate the reduction gear 99 in the forward and reverse directions. The motor 10 is a three-phase brushless motor (i.e., SPM or IPM motor) in which a permanent magnet (i.e., a magnetic component) is embedded in a rotor.

The motor 10 includes a first winding set 180 and a second winding set 280. The winding sets 180 and 280 have the same electrical characteristics, and are unwound (distribution-winding) on a common stator by shifting the electric angle by 30 [deg] from each other. In response to the above configuration, the windings 180 and 280 are controlled to be energized with a phase current whose phase φ is shifted by 30 [deg]. By optimizing the current supply phase difference, the output torque can be improved. It is also possible to reduce sixth-order torque ripple. Furthermore, the noise and vibration canceling merits can be maximized by the phase difference energization. In addition, since heat generation is also averaged, it is possible to reduce temperature-dependent inter-system errors such as the detection value and torque of each sensor.

Hereinafter, the combination of the first inverter 120 and the first control unit 170 and the like related to the drive control of the first winding set 180 is defined as the first system L1, the combination of the second inverter 220 and the second control unit 270 and the like related to the drive control of the second winding set 280 is referred to as the second system L2. The configuration related to the first system L1 is mainly designated by a reference numeral in the 100s, and the configuration according to the second system L2 is mainly designated by a reference numeral in the 200s. Further, in the first system L1 and the second system L2, the similar configurations have the same reference numerals in the last two digits. For the other configuration described below, the term "first" is indicated with a suffix "1," and the term "second" is indicated with a suffix "2."

The motor control device 80 includes a first inverter 120 and a second inverter 220, a first control unit 170, a second control unit 270, and the like.

The first inverter 120 (i.e., a first power conversion unit) is connected to the first power supply 191 via the power input line 114, and the DC power supplied from the first power supply 191 is converted to the AC power for each of the U, V, and W phases, and supplied to the motor 10. In the present embodiment, the first inverter 120 is configured to a full bridge circuit including a series connection body of a set of switching elements for each phase of U, V, and W. Each switching element is operated in an on state and an off state by an operation signal output from the first control unit 170. For example, the switching element is formed by MOSFETs. Further, the second inverter 220 (i.e., a second power conversion unit) is connected to the second power supply 291 via the power input line 214. The second inverter 220 has the same configuration as the first inverter 120. Each switching element of the second inverter 220 is operated in an on state and an off state by an operation signal output from the second control unit 270.

The first power supply 191 (i.e., a first power supply unit) and the second power supply 291 (i.e., a second power supply unit) are both lead batteries having a rated voltage of 12 [V], and are connected to each other by a DC-DC converter (not shown). One of the supplies is connected to an alternator. The capacity of the first power supply 191 and the capacity of the second power supply 291 may be the same or different. In addition, each inverter may be connected to two power supplies only in the operation mode where redundancy is required for the power supply, and both the first inverter 120 and the second inverter 220 may be connected to one of the power supplies in the operation mode where redundancy is not required. When connected to a different power source or supplied from a common power source by different wiring, the first maximum output voltage Vm1 may be lower than the second maximum output voltage Vm2, which is the maximum output voltage that can be output to the second winding set 280 from the second power supply 291, that is the second inverter 220, due to the power consumption and deterioration of one of the power supplies, the difference in wiring impedance, and the like.

The motor control device 80 includes a first current detection unit 130 that detects a current flowing through each phase of the first inverter 120, that is, each phase (U, V, W) of the first winding set 180, and a second current detection unit 230 that detects a current flowing through each phase of the second inverter 220, that is, each phase (U, V, W) of the second winding set 280.

The first current detection unit 130 includes phase detection units 131, 132, 133 provided in each phase of the lower arm of the first inverter 120. The U-phase detection unit 131 detects the current flowing through the U-phase coil of the first winding set 180 as the U-phase current Iu1. The V-phase detection unit 132 detects the current flowing through the V-phase coil of the first winding set 180 as the V-phase current Iv1. The W phase detection unit 133 detects the current flowing through the W phase coil of the first winding set 180 as the W phase current Iw1. Each phase detection unit 131 to 133 includes, for example, a shunt resistor. Each phase detection unit 131 to 133 may be configured by a Hall IC. Further, the second current detection unit 230 has the same configuration as the first current detection unit 130. The second current detection unit 230 includes a U-phase detection unit 231, a V-phase detection unit 232, and a W-phase detection unit 233, and detects the U-phase current Iu2, the V-phase current Iv2, and the W-phase current Iw2, respectively.

The motor control device 80 includes the voltage detection unit 140 that detects the input voltage Vin1 input from the first power supply 191 to the first inverter 120, and the voltage detection unit 240 that detects the input voltage Vin2 input from the second power supply 291 to the second inverter 220.

The motor 10 is provided with a rotation angle sensor 11 that detects the rotation angle θ of the motor 10. The rotation angle sensor 11 includes, for example, a resolver. Further, the rotation angle sensor 11 can calculate the angular velocity ω of the motor 10 based on the rotation angle θ.

The motor control device 80 controls the steering assist torque generated by the motor 10. The steering torque Ts detected by the torque sensor 94, the steering speed Vs detected by the steering angle sensor 95, and the vehicle speed Vc of the own vehicle detected by the vehicle speed sensor 93 are input to the motor control device 80. The motor control device 80 generates a desired steering assist torque by controlling the torque of the motor 10 according to the respective values of the steering torque Ts, the steering speed Vs, and the vehicle speed Vc.

Figure 3:
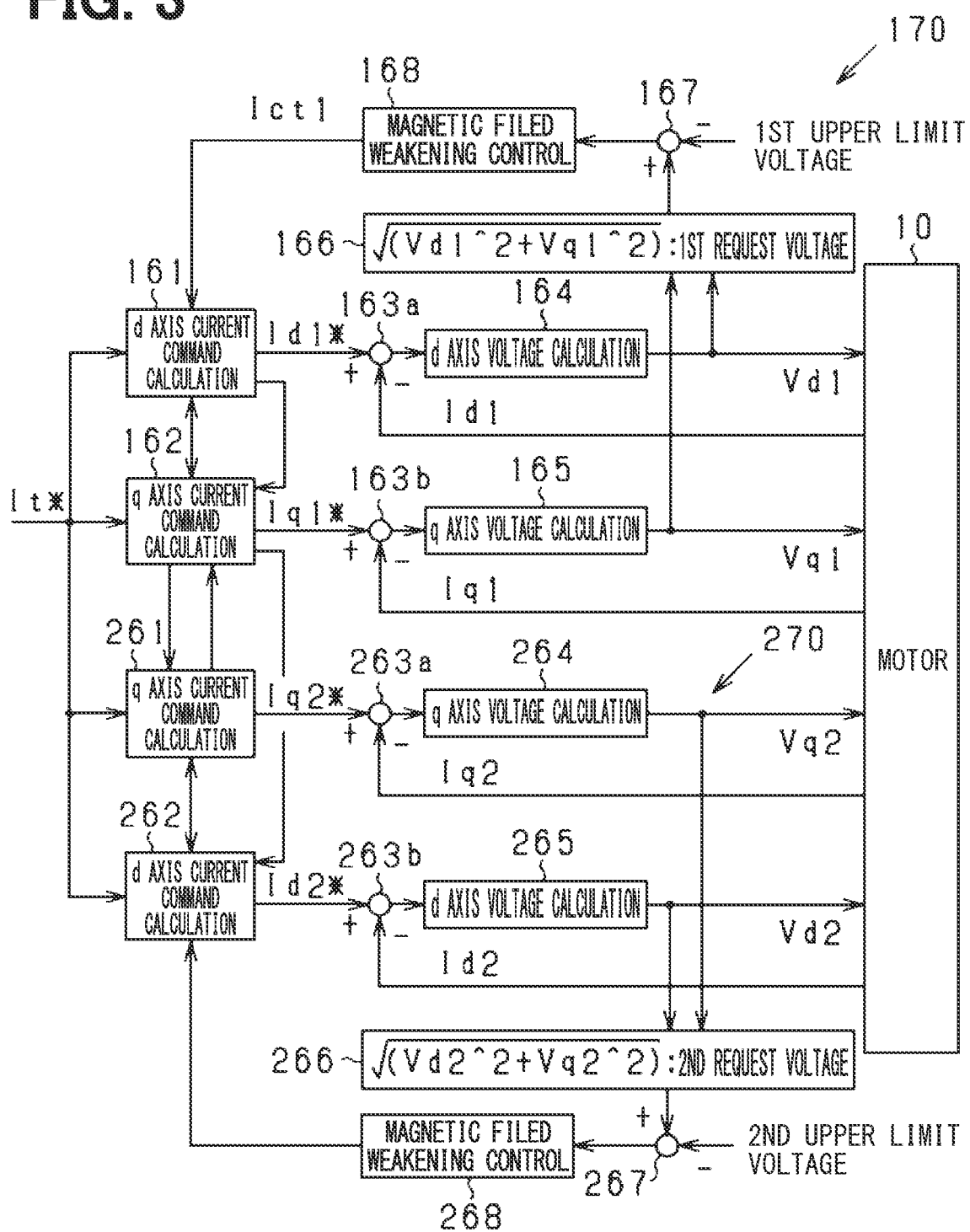
FIG. 3 is a block diagram showing a first control unit and a second control unit according to the first embodiment.

FIG. 3 shows the motor 10 and the first control unit 170 and the second control unit 270 of the motor control device 80.

The control units 170 and 270 mainly include a well-known microcomputer equipped with a CPU, ROM, RAM, an input/output IF, and the like. Each function of the control units 170 and 270 may be functionally realized by executing a program stored in advance in the ROM on the CPU, or may be realized by dedicated hardware. The control units 170 and 270 may each have a microcomputer, and both the control units 170 and 270 may have one microcomputer.

First, the basic control of the first control unit 170 and the second control unit 270 will be described by taking the first control unit 170 as an example.

The first control unit 170 outputs an operation signal corresponding to a desired steering assist torque to each switching element of the first inverter 120 based on the steering torque Ts, the steering speed Vs, the vehicle speed Vc, and the rotation angle θ. In the present embodiment, in the first control unit 170, the d-axis voltage Vd1 and the q-axis voltage Vq1 are calculated so as to control the currents Id1 and Iq1, obtained by converting the phase currents Iu1, Iv1 and Iw1 detected by the first current detection unit 130 into two phases, using the current commands Id1* and Iq1* described later.

The first control unit 170 has the d-axis current command calculation unit 161, the q-axis current command calculation unit 162, the current deviation calculation units 163a, 163b, the d-axis voltage calculation unit 164, the q-axis voltage calculation unit 165, the request voltage calculation unit 166, the voltage deviation calculation unit 167, and the field weakening control unit 168 as functions for generating steering assist torque. Generally, the field weakening corresponds to passing a d-axis current in the negative direction, but in the present specification, a value corresponding to how much the voltage required by the field weakening control unit 168 exceeds the upper limit voltage is calculated. Based on the calculated value, the current command including the flow of the d-axis current in the negative direction is corrected to prevent the required voltage from exceeding the maximum output voltage.

Each phase current Iu1, Iv1, Iw1 detected by the first current detection unit 130 is converted from an analog value to a digital value by a well-known A/D conversion unit (not shown), and then converted into a d-axis current Id1 and a q-axis current Iq1 by a well-known three-phase two-phase coordinate conversion unit (not shown). The three-phase two-phase coordinate conversion unit converts each phase current Iu1, Iv1, Iw1 converted into a digital value based on the rotation angle θ of the motor 10 into the d-axis current Id1 and the q-axis current Iq1 as d-q coordinate values. Here, among the axes defining the d-q coordinates, the d-axis is the axis of the ineffective current component, that is, the exciting current component which is a current contributing to the rotation magnetic field accompanying the rotation of the motor 10. Further, the q-axis is an axis of an effective current component, that is, a torque current component which is a current contributing to the magnet torque of the motor 10.

The q-axis current command calculation unit 162 calculates the first q-axis current command Iq1\* based on the command value It\* that commands the torque to be output to the motor 10 and Ict1 calculated by the magnetic field weakening control. The command value It\* is calculated based on the steering torque Ts, the steering speed Vs, and the vehicle speed Vc. The command value It\* may be calculated by the first control unit 170, or may be calculated by a higher-level ECU (Electronic Control Unit). Further, the d-axis current command calculation unit 161 calculates the first d-axis current command Id1\* from the value of ict1 calculated by the magnetic field weakening control in case of the SPM motor, and calculates the command value It\* that commands the torque to be output to the motor 10 from the value of Ict1 calculated by the magnetic field weakening control in case of an IPM motor.

The current deviation calculation unit 163b calculates the q-axis deviation ΔIq1 which is a value obtained by subtracting the q-axis current Iq1 from the first q-axis current command Iq1\*. The current deviation calculation unit 163a calculates the d-axis deviation ΔId1, which is a value obtained by subtracting the d-axis current Id1 from the first d-axis current command Id1\*.

The q-axis voltage calculation unit 165 performs PI control so that the q-axis deviation ΔIq1 approaches 0, and calculates the q-axis voltage Vq1. The d-axis voltage calculation unit 164 performs PI control so that the d-axis deviation ΔId1 approaches 0, and calculates the d-axis voltage Vd1.

A well-known two-phase three-phase coordinate conversion unit (not shown) converts the q-axis voltage Vq1 and the d-axis voltage Vd1 into U, V, and W phase voltages and outputs them based on the rotation angle θ. A well-known PWM control unit (not shown) outputs an operation signal for turning on/off each switching element of the first inverter 120 by duty control based on each phase voltage. Based on this operation signal, each switching element of the first inverter 120 is operated on and off. Further, in the second system L2, the second control unit 270 includes a d-axis current command calculation unit 262, a q-axis current command calculation unit 261, current deviation calculation units 263a, 263b, a d-axis voltage calculation unit 265, a q-axis voltage calculation unit 264, a request voltage calculation unit 266, a voltage deviation calculation unit 267, and a magnetic field weakening control unit 268. Then, the second control unit 270 also executes the same basic control as the first control unit 170. As a result, the motor 10 is driven, and the motor 10 generates steering assist torque on the steering shaft 92.

Here, in the motor 10 including the first winding set 180 and the second winding set 280, the voltage equations of the above equations (1) and (2) are established. In equations (1) and (2), it is necessary to set the first request voltage (i.e., the first output voltage) or $\sqrt{(Vd1^2+Vq1^2)}$ (i.e., the square root of $(Vd1^2+Vq1^2)$) to be equal to or less than the maximum output voltage so as to set Id1, Iq1, Id2, and Iq2 to be the first d-axis current command Id1\*, the first q-axis current command Iq1\*, the second d-axis current command Id2\*, and the second q-axis current command Iq2\*, respectively. Similarly, in the second system L2, the subscript "1" in the equations (1) and (2) and the subscript "2" are exchanged to set the second request voltage or $\sqrt{(Vd2^2+Vq2^2)}$ (i.e., the square root of $(Vd2^2+Vq2^2)$) to be equal to or lower than the maximum output voltage.

The first maximum output voltage Vm1 that the first inverter 120 can output to the first winding set 180 is determined by the voltage of the first power supply 191 and the resistance of the power input line 114 and the loss of the first inverter 120. The resistance of the power input line 114 and the loss of the first inverter 120 can also be measured in advance. Therefore, the first maximum output voltage Vm1 can be calculated based on the input voltage Vin1 detected by the voltage detection unit 140, the resistance of the power input line 114, and the loss of the first inverter 120. Similarly, the second maximum output voltage Vm2 can be calculated based on the input voltage Vin2 detected by the voltage detection unit 240, the resistance of the power input line 214, and the loss of the second inverter 220.

As described above, the first maximum output voltage Vm1 that the first inverter 120 can output to the first winding set 180 may be lower than the second maximum output voltage Vm2 that the second inverter 220 can output to the second winding set 280. In this case, even if the second request voltage is the second maximum output voltage Vm2 or less, the first request voltage may become higher than the first maximum output voltage Vm1, and the current cannot be controlled and an unintended current may flow in the winding set. In particular, when the second inverter 220 outputs a voltage close to the second maximum output voltage Vm2, the motor may generate a voltage higher than the first maximum output voltage Vm1 and an unintended current may flow through the first inverter 120.

Therefore, the first upper limit voltage (i.e., the first target voltage) as a reference for starting to suppress the first request voltage, which is the required value of the voltage output by the first inverter 120, is set to be 90% of the first maximum output voltage Vm1 (which is smaller than the first maximum output voltage Vm1). Similarly, the second upper limit voltage (i.e., the second target voltage) of the second inverter 220 is set to 90% of the second maximum output voltage Vm2 (which is smaller than the second maximum output voltage Vm2). The first upper limit voltage (or the second upper limit voltage) may be equal to the first maximum output voltage Vm1 (or the second maximum output voltage Vm2), or may be set to 80% of the first maximum output voltage Vm1 (or the second maximum output voltage Vm2). Further, the first maximum output voltage Vm1 and the first upper limit voltage may be set by the first control unit 170 or may be set by a higher-level ECU. The second maximum output voltage Vm2 and the second upper limit voltage may be set by the second control unit 270 or may be set by a higher-level ECU.

Then, when the first request voltage is not higher than the first upper limit voltage, the first control unit 170 sets Ict1 calculated by the field weakening control to be 0, and calculates the first q-axis current command Iq1\* and the first d-axis current command Id1\* from the command value It\* that commands the torque to be output to the motor 10. Then, when the first request voltage is higher than the first upper limit voltage, the first control unit 170 sets Ict1 calculated by field weakening control to be a value larger than 0, and calculates the first q-axis current command Iq1\* and the first d-axis current command Id1\* from the command value It\* that commands the torque to be output to the motor 10 and ict1, so that the first request voltage is lowered.

The second control unit 270 controls the second inverter 220 based on the second q-axis current command Iq2* and the second d-axis current command Id2*.

Figure 4:
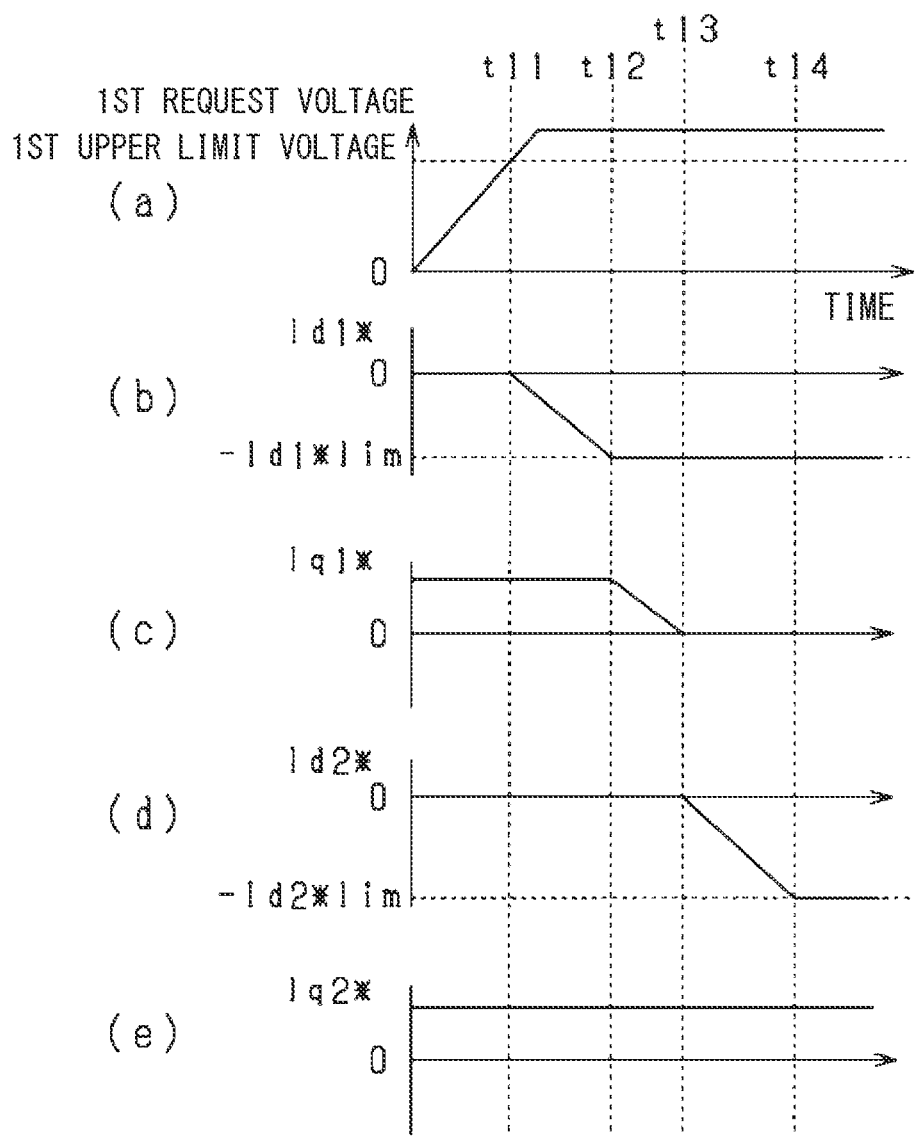
FIG. 4 is a time chart showing a first request voltage and each current command of the first embodiment.

As described above, the first d-axis current command Id1* is corrected so as to reduce the back electromotive force of the first winding set 180, that is, the first d-axis current command Id1* as the d-axis current Id1 of the first winding set 180 in the above equation (2) is set to be negative, so that the q-axis voltage Vq1 of the first winding set 180 can be lowered. Therefore, as shown in (a) and (b) of FIG. 4, when the first request voltage is higher than the first upper limit voltage (at time t11 to t12), the first d-axis current command Id1* is lowered from 0, and the first d-axis current command Id1* is increased in the negative direction until the request voltage is equal to or lower than the upper limit voltage or reaches the lower limit value. That is, as shown in (a) to (c) of FIG. 4, when the first request voltage is higher than the first upper limit voltage (at time t11 to t12), the first control unit 170 calculates the d-axis voltage Vd1 and the q-axis voltage Vq1 based on the first correction d-axis current command in which the first d-axis current command Id1* is corrected and the first q-axis current command Iq1* so as to reduce the counter electromotive force of the first winding set 180. In FIG. 4, in order to show a sequence that the first d-axis current command Id1* is increased in the negative direction, the first q-axis current command Iq1* is decreased, and the second d-axis current command Id2* is increased in the negative direction, an example of a waveform in an operation pattern in which the first request voltage exceeds the first upper limit voltage and reaches the maximum output voltage is shown even if the first d-axis current command Id1* is the lower limit, the first q-axis current command Iq1* is 0 A, and the second d-axis current command Id2* is the lower limit.

The first correction d-axis current command that is prepared by correcting the first d-axis current command Id1* so as to reduce the back electromotive force of the first winding set 180 is set not to exceed the first d-axis limit value (that is −Id1*lim). The first d-axis limit value (i.e., −Id1*lim) is set to a value at which, for example, the permanent magnet of the motor 10 does not demagnetize (deteriorate). Even when the first correction d-axis current command reaches the first d-axis limit value (=−Id1*lim) (at time t12), the rotation speed of the motor may be increased according to the torque generated by the energization applied to the second winding set that has a margin for the maximum output voltage, so that the first request voltage calculated based on the first correction d-axis current command and the first q-axis current command Iq1* may be higher than the first upper limit voltage.

As described above, in the above equation (2), by reducing the first q-axis current command Iq1* as the q-axis current Iq1 of the first winding set 180 to be the first correction q-axis current command, the value of "R×Iq1", as a result, the q-axis voltage Vq1 of the first winding set 180 can be lowered. Therefore, as shown in (a) to (c) of FIG. 4, when the first correction d-axis current command reaches the first d-axis limit value (i.e., −Id1*lim) (at time t12 to t13), the first q-axis current command Iq1* is decreased, and the amount of decrease of the first q-axis current command Iq1* is increased until the request voltage is equal to or lower than the upper limit voltage or reaches the lower limit value. That is, the first control unit 170 calculates the d-axis voltage Vd1 and the q-axis voltage Vq1 based on the first correction q-axis current command and the first d-axis current command Id1* (specifically, the first d-axis limit value (i.e., −Id1*lim)) in which the absolute value of the first q-axis current command Iq1* is reduced when the first request voltage is higher than the first upper limit voltage.

Even when the first correction q-axis current command reaches zero (at time t13), the motor rotation speed may become high due to the torque accompanying the energization of the second winding set, which has a margin for the maximum output voltage, so that the first request voltage calculated based on the first correction d-axis current command and the first correction q-axis current command may be higher than the first upper limit voltage.

As described above, the second d-axis current command Id2* is corrected so as to reduce the back electromotive force of the second winding set 280, that is, the second d-axis current command Id2* as the d-axis current Id2 of the second winding set 280 in the above equation (2) is set to be negative, so that the q-axis voltage Vq1 of the first winding set 180 can be lowered. Therefore, as shown in (a) to 8d) of FIG. 4, when the first correction q-axis current command reaches zero (at time t13 to t14), the second d-axis current command Id2* is lowered from 0, and the second d-axis current command Id2* is increased in the negative direction until the request voltage is equal to or lower than the upper limit voltage or reaches the lower limit value. That is, as shown in (a) to (e) of FIG. 4, the second control unit 270 calculates the d-axis voltage Vd2 and the q-axis voltage Vq2 based on the second correction d-axis current command that is prepared by correcting the second d-axis current command Id2* so as to reduce the back electromotive force of the first winding set 180, the first d-axis limit value (i.e., −Id1*lim), and the first correction q-axis current command (specifically, zero) when the first correction q-axis current command reaches zero (at time t13 to t14).

The second correction d-axis current command that is prepared by correcting the second d-axis current command Id2* so as to reduce the back electromotive force of the second winding set 280 is set not to exceed the second d-axis limit value (that is −Id2*lim). The second d-axis limit value (i.e., −Id2*lim) is set to a value at which, for example, the permanent magnet of the motor 10 does not demagnetize (deteriorate). When the second correction d-axis current command reaches the second d-axis limit value (i.e., −Id2*lim) (after time t14), the second correction d-axis current command is set to the second d-axis limit value (i.e., −Id2*lim). In FIG. 4, the second q-axis current command Iq2* is not changed. That is, when the second request voltage is not higher than the second upper limit voltage, it may be desirable not to change the second q-axis current command Iq2* calculated based on the torque command value It*.

Figure 5:
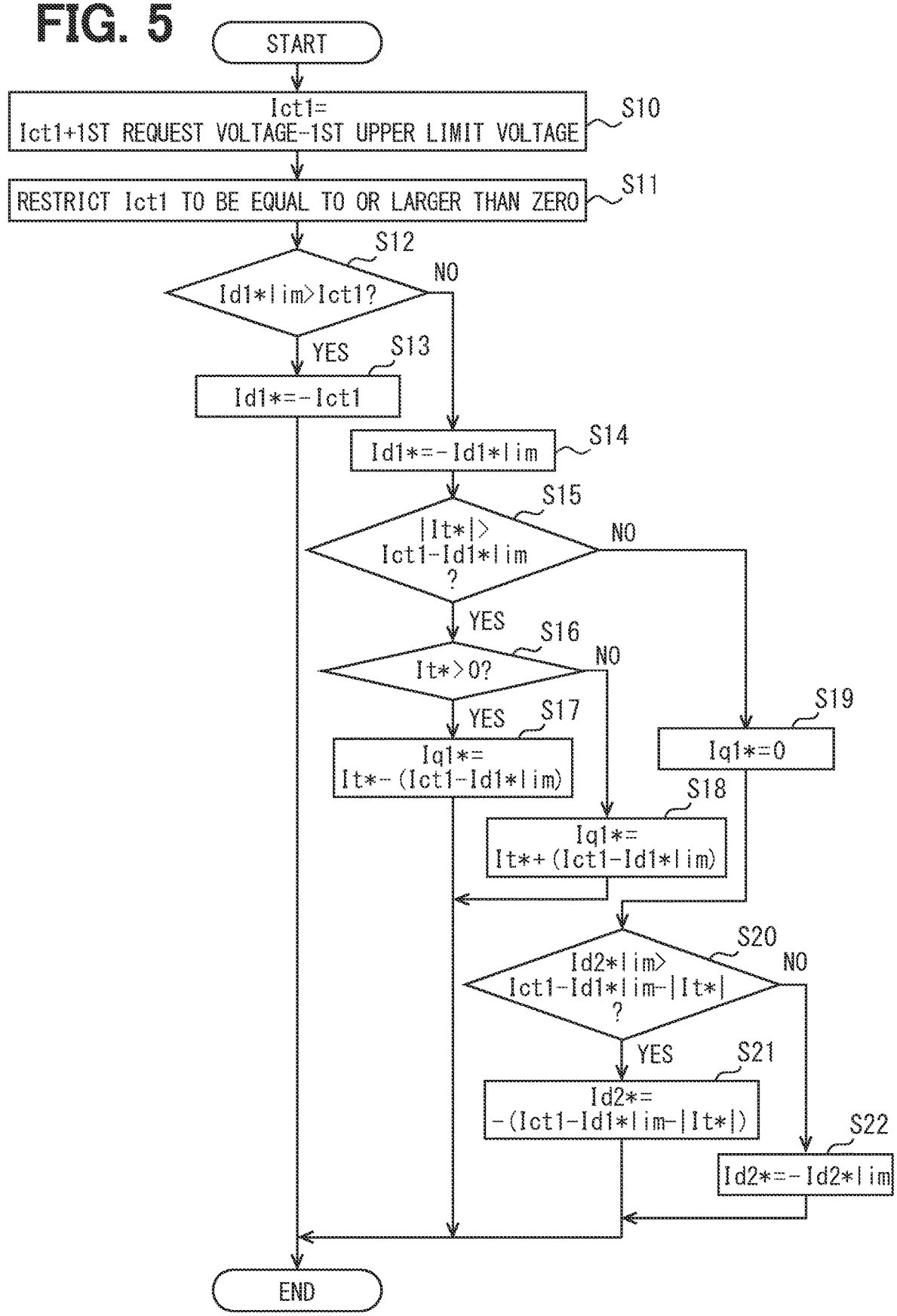
FIG. 5 is a flowchart showing the control of the first control unit and the second control unit of the first embodiment.

FIG. 5 is a flowchart showing a control procedure for correcting the current commands Id1*, Iq1*, and Id2* as shown in FIG. 4. This series of processes is repeatedly executed by the first control unit 170 and the second control unit 270 at a predetermined cycle.

First, the excess integrated value Ict1 is set to a value calculated by adding the previous excess integrated value Ict1 and the first voltage excess amount (that is, "the first request voltage minus the first upper limit voltage") by which the first request voltage (i.e., the first output voltage) exceeds the first upper limit voltage (at S10). That is, the excess integrated value Ict1 is an integrated value of the first voltage excess amount in which the first request voltage exceeds the first upper limit voltage. When the first request voltage is lower than the first upper limit voltage, the first voltage excess amount becomes negative. In the following examples, the excess integrated value Ict1 exemplifies a value obtained by accumulating the first voltage excess amount (i.e., the first request voltage minus the first upper limit voltage) in which the first request voltage exceeds the first upper limit voltage. Alternatively, the PI control may be performed for the deviation between the first request voltage and the first upper limit voltage, or the weighting accumulation may be performed by multiplying the gain with the excess amount.

Subsequently, the excess integrated value Ict1 is limited to 0 or more (at S11). Specifically, when the excess integrated value Ict1 is positive, the excess integrated value Ict1 is not changed, and when the excess integrated value Ict1 is negative, the excess integrated value Ict1 is set to be 0.

Subsequently, it is determined whether or not the excess integrated value Ict1 is smaller than Id1*lim (at S12). Id1*lim is an absolute value of the first d-axis limit value (i.e., −Id1*lim). In this determination, when it is determined that the excess integrated value Ict1 is smaller than Id1*lim ("YES" at S12), the first d-axis current command Id1* is set to be (−Ict1), that is, negative. As a result, the larger the first voltage excess amount, the lower the first d-axis current command Id1* and, as a result, the first correction voltage are calculated. In addition, the larger the excess integrated value Ict1 which is the integrated value of the first voltage excess amount, the lower the first d-axis current command Id1* and, as a result, the first correction voltage are calculated.

On the other hand, when it is determined in the determination of S12 that the excess integrated value Ict1 is not smaller than Id1*lim ("NO" at S12), the first d-axis current command Id1* is set as the first d-axis limit value (i.e., −Id1*lim).

Subsequently, it is determined whether |It*| is larger than "Ict1−Id1*lim" (at S15). That is, it is determined whether or not there is room for reducing the first q-axis current command Iq1* by an amount that the excess integrated value Ict1 cannot be reduced by Id1*lim. In this determination, when it is determined that |It*| is larger than "Ict1−Id1*lim ("YES" at S15), it is determined whether or not the command value It* is larger than 0 (at S16).

When it is determined in the determination of S16 that the command value It* is larger than 0 ("YES" at S16), the first q-axis current command Iq1* is set to a value obtained by subtracting (Ict1−Id1*lim) from the command value It* (at S17). On the other hand, when it is determined in the determination of S16 that the command value It* is not larger than 0 ("NO" at S16), the first q-axis current command Iq1* is set to a value obtained by adding (Ict1−Id1*lim) to the command value It* (at S18). That is, the absolute value of the first q-axis current command Iq1* is reduced according to the positive or negative of the first q-axis current command Iq1* (i.e., the command value It*). Then, the series of processing described above is terminated (END).

On the other hand, when it is determined in S15 that |It*| is not larger than "Ict1−Id1*lim ("NO" at S15), the first q-axis current command Iq1* is set to 0 (at S19). That is, when there is no room for reducing the absolute value of the first q-axis current command Iq1*, the first q-axis current command Iq1* is set to 0.

Subsequently, it is determined whether or not Id2*lim is larger than "Ict1−Id1*lim−|It*|" (at S20). That is, it is determined whether or not there is room to reduce a value that the excess integrated value Ict1 cannot be reduced by Id1*lim and the first q-axis current command Iq1* (i.e., the command value It*) from the second d-axis current command Id2*. In this determination, when it is determined that Id2*lim is larger than "Ict1−Id1*lim−|It*|" ("YES" at S20), the second d-axis current command Id2* is set to a negative value that is obtained by subtracting Id1*lim and the absolute value of the command value It* from the excess integrated values Ict1 (at S21).

On the other hand, when it is determined in the determination of S20 that Id2*lim is not larger than "Ict1−Id1*lim−|It*|" ("NO" at S20), the second d-axis current command Id2* is set to the second d-axis limit value (i.e., −Id2*lim). Then, the series of processing described above is terminated (END).

The processing of S10 and S11 corresponds to the processing of the voltage deviation calculation unit 167 and the field weakening control unit 168, and the processing of S12 to S19 corresponds to the processing of the d-axis current command calculation unit 161 and the q-axis current command calculation unit 162, and the processing of S20 to S22 corresponds to the processing of the d-axis current command calculation unit 262. In S10 to S22, Id1*, Iq1*, and Id2* corresponding to the excess amount Ict1 are set in a relationship of "1:1", alternatively, as shown in the equations (1) and (2), the weighting of these values may be changed since the influence of Id1*, Iq1*, and Id2* on the voltage are different. This also applies to the following examples. Further, although only the processing of the system 1 is shown in FIG. 5, if the request voltage exceeds the upper limit voltage even in the system 2, the current command on the system 2 side is not performed. That is, after S19, it ends once without performing S20 to S22.

Figure 6:
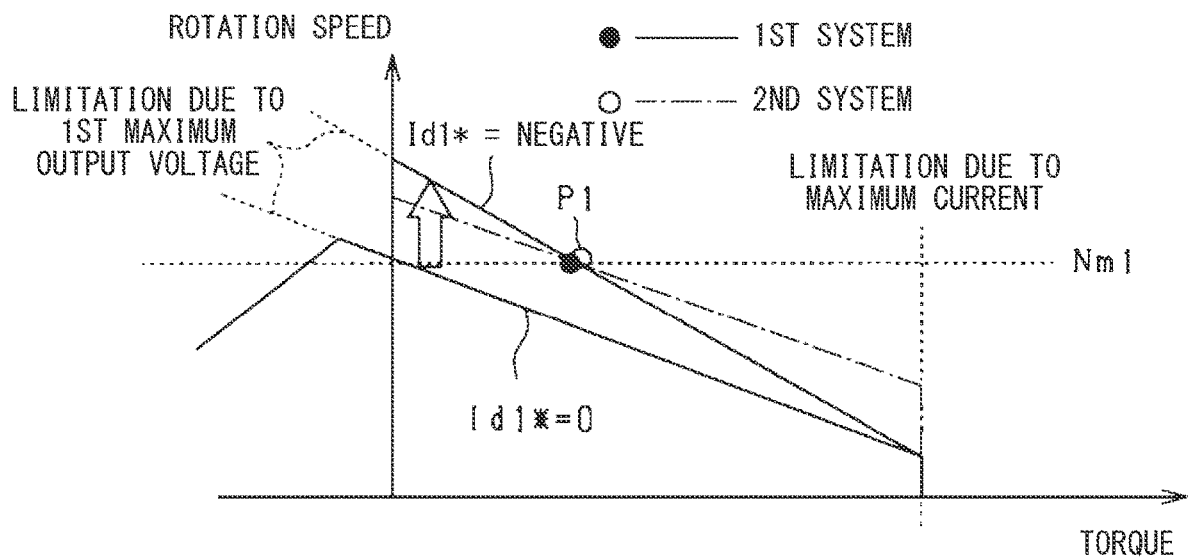
FIG. 6 is a graph showing a change in the relationship between the maximum torque and the maximum rotation speed when the first d-axis current command is negative.
Figure 7:
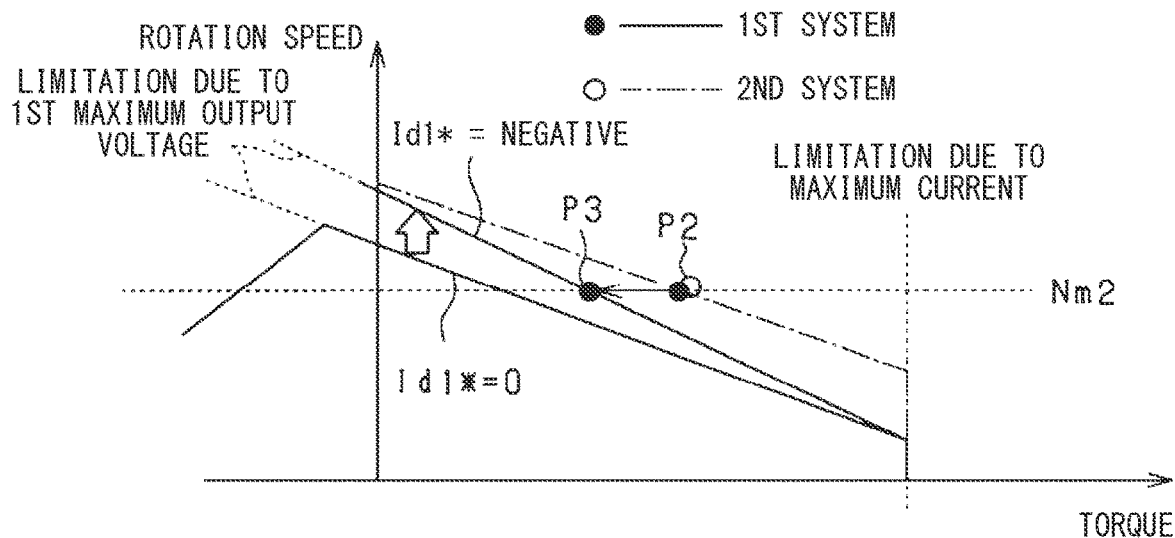
FIG. 7 is a graph showing a change in the relationship between the maximum torque and the maximum rotation speed when the first d-axis current command is made negative and the first q axis current command is decreased.
Figure 8:
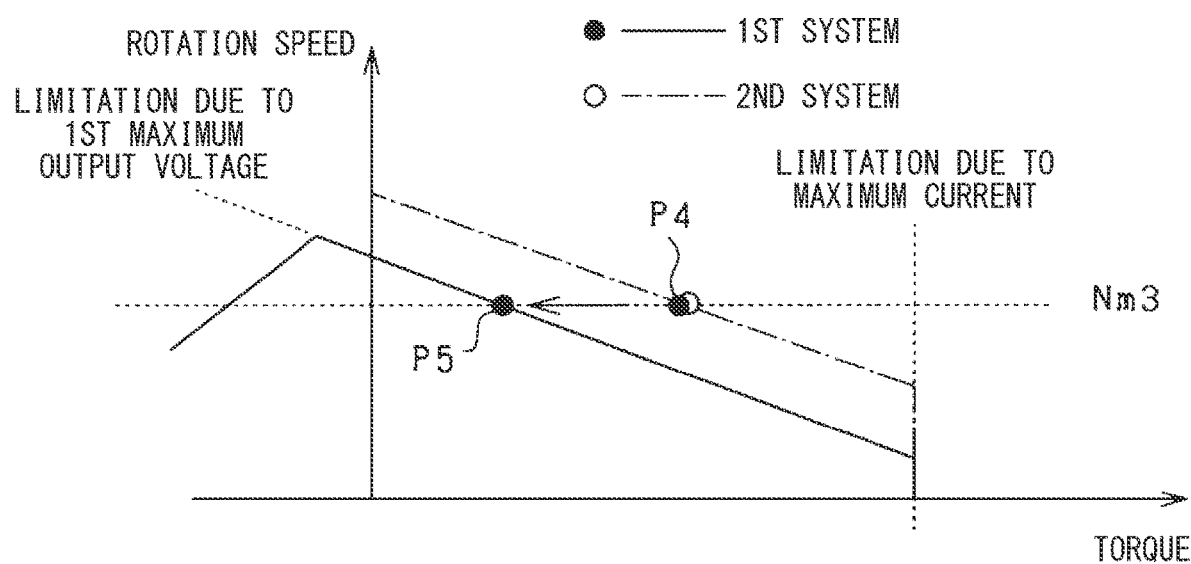
FIG. 8 is a graph showing a change in the relationship between the maximum torque and the maximum rotation speed when the first q-axis current command is reduced.

FIGS. 6 to 8 are graphs of NT characteristics of the first system and the second system when the back electromotive forces of the two winding sets are different due to a difference in power supply voltage or a difference in the number of turns. FIG. 6 is a graph showing a change in the relationship between the maximum torque and the maximum rotation speed when the first d-axis current command Id1* is negative. In a state where the rotation speed of the motor 10 is defined as the rotation speed Nm1, the torque at the point P1 is commanded in the first system L1 and the second system L2. In this case, the second system L2 can output the torque at the point P1 with the rotation speed Nm1. On the other hand, in the first system L1 with the first d-axis current command Id1* equal to 0, the torque at the point P1 cannot be output at the rotation speed Nm1. Therefore, by making the first d-axis current command Id1* negative, the limit due to the maximum output voltage can be raised as shown by the arrow. Therefore, even in the first system L1, the torque at the point P1 can be output at the rotation speed Nm1.

FIG. 7 is a graph showing a change in the relationship between the maximum torque and the maximum rotation speed when the first d-axis current command Id1* is made negative and the first q axis current command Iq1* is decreased. In a state where the rotation speed of the motor 10 is defined as the rotation speed Nm2, the torque at the point P2 is commanded in the first system L1 and the second system L2. Here, by making the first d-axis current command Id1* negative, the limit due to the maximum output voltage is raised as shown by the thick arrow. Further, the first q-axis current command Iq1* is reduced. Therefore, in the first system L1, the torque at the point P3 can be output at the rotation speed Nm2, and it is possible to suppress exceeding the limit due to the maximum output voltage.

FIG. 8 is a graph showing a change in the relationship between the maximum torque and the maximum rotation speed when the first q-axis current command Iq1* is reduced. In a state where the rotation speed of the motor 10 is defined as the rotation speed Nm3, the torque at the point P4 is commanded in the first system L1 and the second system L2. Here, the first q-axis current command Iq1* is reduced. Therefore, in the first system L1, the torque at the point P5 can be output at the rotation speed Nm3, and it is possible to suppress exceeding the limit due to the maximum output voltage.

The present embodiment described above in detail has the following advantages.

When the first request voltage is higher than the first upper limit voltage, the first control unit 170 modifies the first d-axis current command Id1* and the first q-axis current command Iq1* to control the first inverter 120. Accordingly, it is possible to prevent the voltage required for the first inverter 120 from becoming higher than the first maximum output voltage Vm1, and it is possible to prevent the current from becoming uncontrollable and preventing an not-required current from flowing through the winding set.

When the first request voltage is higher than the first upper limit voltage, the first control unit 170 reduces the absolute value of the first q-axis current command Iq1*, and calculates the first correction voltage based on the first correction q-axis current command and the first d-axis current command Id1*. As described above, in the above equation (2), by reducing the first q-axis current command Iq1* as the q-axis current Iq1 of the first winding set 180 to be the first correction q-axis current command, the value of "R×Iq1", as a result, the q-axis voltage Vq1 of the first winding set 180 can be lowered. Therefore, the d-axis voltage Vd1 and the q-axis voltage Vq1 calculated based on the first corrected q-axis current command and the first d-axis current command Id1* can be lowered as compared with those before the correction.

The first control unit 170 calculates the first correction voltage based on the correction d-axis current command, which is prepared by correcting the first d-axis current command Id1* so as to reduce the counter electromotive force of the first winding set 180, and the first q-axis current command Iq1* when the first request voltage is higher than the first upper limit voltage. Accordingly, the first d-axis current command Id1* is corrected so as to reduce the back electromotive force of the first winding set 180, that is, the first d-axis current command Id1* as the d-axis current Id1 of the first winding set 180 in the above equation (2) is set to be negative, so that the q-axis voltage Vq1 of the first winding set 180 can be lowered. Therefore, the d-axis voltage Vd1 and the q-axis voltage Vq1 calculated based on the first corrected d-axis current command and the first q-axis current command Iq1* can be lowered as compared with those before the correction.

The first control unit 170 calculates the first correction voltage based on the second correction d-axis current command, which is prepared by correcting the second d-axis current command Id2* so as to reduce the back electromotive force of the second winding set 280, the first d-axis limit value (−Id1*lim), and the first q-axis current command Iq1* when the first correction d-axis current command reaches the first d-axis limit value (−Id1*lim). Accordingly, the second d-axis current command Id2* is corrected so as to reduce the back electromotive force of the first winding set 180, that is, the second d-axis current command Id2* as the d-axis current Id2 of the second winding set 280 in the above equation (2) is set to be negative, so that the q-axis voltage Vq1 of the first winding set 180 can be lowered. Therefore, the d-axis voltage Vd1 and the q-axis voltage Vq1 calculated based on the second correction d-axis current command, the first d-axis limit value (−Id1*lim), and the first q-axis current command Iq1* are reduced, compared with the values before the correction.

The larger the first voltage excess amount (i.e., the value obtained by subtracting the first upper limit voltage from the first request voltage) in which the first request voltage exceeds the first upper limit voltage, the larger the unintended current may flow. In this respect, the first control unit 170 can quickly reduce the d-axis voltage Vd1 and the q-axis voltage Vq1 by calculating Ict1 according to the cumulative value of the deviation by PI control or the like within the field weakening control.

Second Embodiment

A second embodiment will be described below with reference to the drawings mainly in terms of differences from the first embodiment.

When the first q-axis current command Iq1* is reduced, the motor 10 may not be able to output the torque of the command value (2It*).

In this regard, the second control unit 270 calculates the d-axis voltage Vd2 and the q-axis voltage Vq2 based on the second correction q-axis current command, which is obtained by increasing the second q-axis current command Iq2* by the amount of decrease (i.e., Ict1−Id1*lim) by which the first q-axis current command Iq1* is reduced, and the second d-axis current command Id2*.

Figure 9:
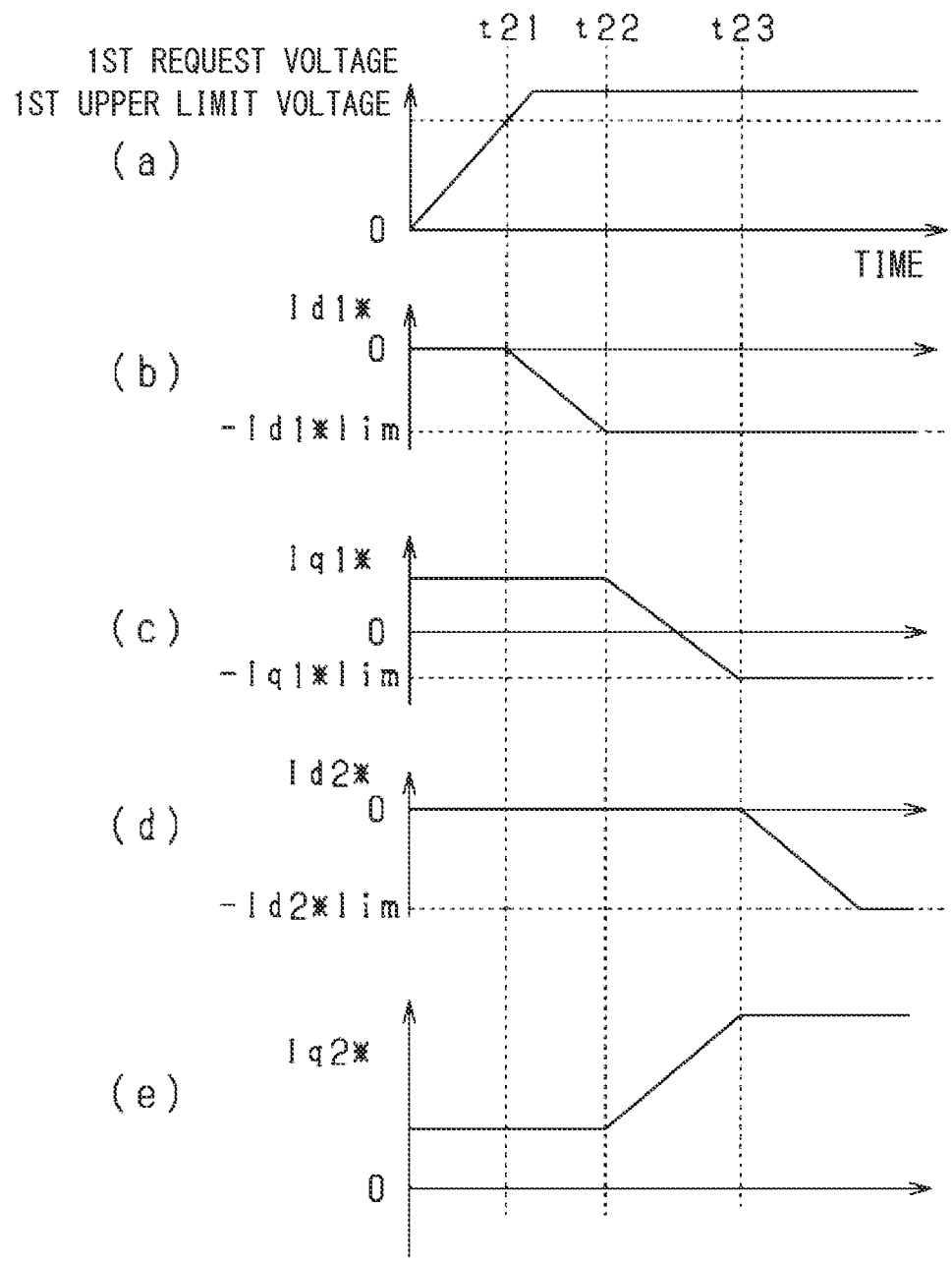
FIG. 9 is a time chart showing a first request voltage and each current command of the second embodiment.

FIG. 9 is a time chart showing the first request voltage and each current command. The times t21 and t22 are the same as the times t11 and t21 in FIG. 4, respectively. (a) and (b) in FIG. 9 are the same as (a) and (b) in FIG. 4, respectively.

Therefore, as shown in (b) to (c) of FIG. 9, when the first correction d-axis current command reaches the first d-axis limit value (i.e., −Id1*lim) (at time t22 to t23), the first q-axis current command Iq1* is decreased, and the amount of decrease of the first q-axis current command Iq1* is increased until the request voltage is equal to or lower than the upper limit voltage or reaches the lower limit value. Further, as shown in (C) and (e) in FIG. 9, the second q-axis current command Iq2* is increased by the amount of decrease (i.e., Ict1−Id1*lim) in which the first q-axis current command Iq1* is decreased. Increasing of the second q-axis current command Iq2* compensates for the decrease in torque due to the decrease in the first q-axis current command Iq1*. Thus, the second q-axis current command Iq2* is increased according to the ratio thereof when the back electromotive forces of two winding sets are different from each other due to the difference in the number of turns.

As shown in (c) and (d) in FIG. 9, when the first correction q-axis current command reaches the first q-axis limit value (i.e., −Iq1*lim) (after time t23), the second d-axis current command Id2* Is lowered below 0, and the second d-axis current command Id2* is increased in the negative direction until the request voltage is equal to or lower than the upper limit voltage or reaches the lower limit value. That is, as shown in (a) to (e) of FIG. 9, the second control unit 270 calculates the d-axis voltage Vd2 and the q-axis voltage Vq2 based on the second correction d-axis current command obtained by correcting the second d-axis current command Id2* so as to reduce the back electromotive force of the first winding set 180, the first d-axis limit value (i.e., −Id1*lim), and the first q-axis current command Iq1* (specifically, the first correction q-axis current command) when the first correction d-axis current command reaches the first d-axis limit value (i.e., −Id1*lim) (after time 22). Further, when the first correction q-axis current command reaches the first q-axis limit value (i.e., −Iq1*lim) (after time t23), the second control unit 270 calculates the d-axis voltage Vd2 and the q-axis voltage Vq2 based on the second correction d-axis current command which is obtained by correcting the second d-axis current command Id2* so as to reduce the back electromotive force of the first winding set 180, the first d-axis limit value (i.e., −Id1*lim), and the first correction q-axis current command (specifically, the first q-axis limit value).

Figure 10:
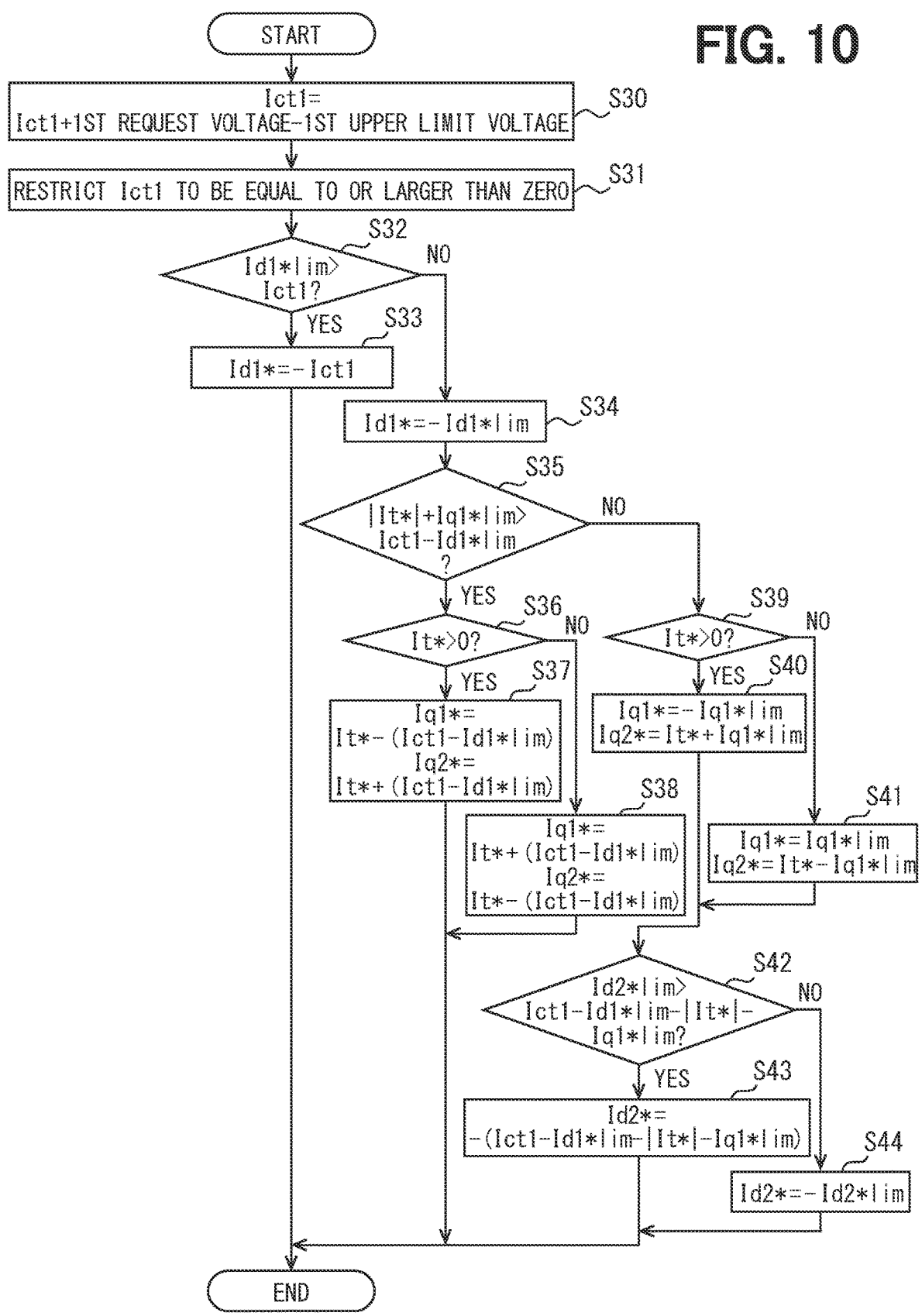
FIG. 10 is a flowchart showing the control of the first control unit and the second control unit of the second embodiment.

FIG. 10 is a flowchart showing a control procedure for correcting the current commands Id1*, Iq1*, Id2* and Iq2* as shown in FIG. 9. This series of processes is repeatedly executed by the first control unit 170 and the second control unit 270 at a predetermined cycle.

The processing at S30 to S34 is the same as the processing at S10 to S14 in FIG. 5.

After the processing of S34, it is determined whether or not Iq1*lim is larger than the value of "Ict1−Id1*lim" (at S35). That is, it is determined whether or not there is room for reducing the first q-axis current command Iq1* (i.e., the command value of It*) by an amount that the excess integrated value Ict1 cannot be reduced by Id1*lim. In this determination, when it is determined that Iq1*lim is larger than the value of "Ict1−Id1*lim" ("YES" at S35), it is determined whether or not the command value It* is larger than 0 (at S36).

When it is determined in the determination of S36 that the command value It* is larger than 0 ("YES" at S36), the first q-axis current command Iq1* is set as the value obtained by subtracting (Ict1−Id1*lim) from the command value It*, and the second q-axis current command Iq2* is set to the value obtained by adding the command value It* to (Ict1−Id1*lim) (at S37). On the other hand, when it is determined in the determination of S36 that the command value It* is not larger than 0 ("NO" at S36), the first q-axis current command Iq1* is set to a value obtained by adding the command value It* and the value of (Ict1−Id1*lim), and the second q-axis current command Iq2* is set to the value obtained by subtracting the value of (Ict1−Id1*lim) from the command value It* (at S38). That is, the first q-axis current command Iq1* is decreased and the second q-axis current command Iq2* is increased, or the first q-axis current command Iq1* is increased and the second q-axis current command Iq2* is decreased, according to the positive or negative of the first q-axis current command Iq1* (i.e., the command value It*). At this time, when the first request voltage is higher than the first upper limit voltage, the first q-axis current command Iq1* is corrected so as to set the first q-axis current command Iq1* to have a positive/negative sign opposite to the positive/negative sign of the command value It*. Then, the series of processing described above is terminated (END).

In this determination of S35, when it is determined that Iq1*lim is not larger than the value of "Ict1−Id1*lim" ("NO" at S35), it is determined whether or not the command value It* is larger than 0 (at S39). In this determination, when it is determined that the command value It* is larger than 0 ("YES" at S39), the first q-axis current command Iq1* is set as the first q-axis limit value (i.e., −Iq1*lim), and the second q-axis current command Iq2* is set to a value obtained by adding the command value It* and Iq1*lim (at S40). On the other hand, when it is determined in the determination of S39 that the command value It* is not larger than 0 ("NO" at S39), the first q-axis current command Iq1* is set as the first q-axis limit value (i.e., Iq1*lim), and the second q-axis current command Iq2* is set to the value obtained by subtracting the first q-axis limit value (i.e., Iq1*lim) from the command value It* (at S41).

Subsequently, it is determined whether or not Id2*lim is larger than the value of "Ict1−Id1*lim−|It*|−Iq1*lim" (at S42). That is, it is determined whether or not there is room to reduce a value that the excess integrated value Ict1 cannot be reduced by Id1*lim, the first q-axis current command Iq1* (i.e., the command value It*) and Iq1*lim from the second d-axis current command Id2*. In this determination, when it is determined that Id2*lim is larger than the value of "Ict1−Id1*lim−|It*|−Iq1*lim" ("YES" at S42), the second d-axis current command Id2* is set to be the negative value obtained by subtracting Id1*lim, the absolute value of the command value It*, and Iq1*lim from the excess integrated value Ict1 (at S43).

On the other hand, when it is determined in the determination of S42 that Id2*lim is not larger than "Ict1−Id1*lim−L It*|−Iq1*lim" ("NO" at S42), the second d-axis current command Id2* is set to the second d-axis limit value (i.e., −Id2*lim). Then, the series of processing described above is terminated (END).

Figure 11:
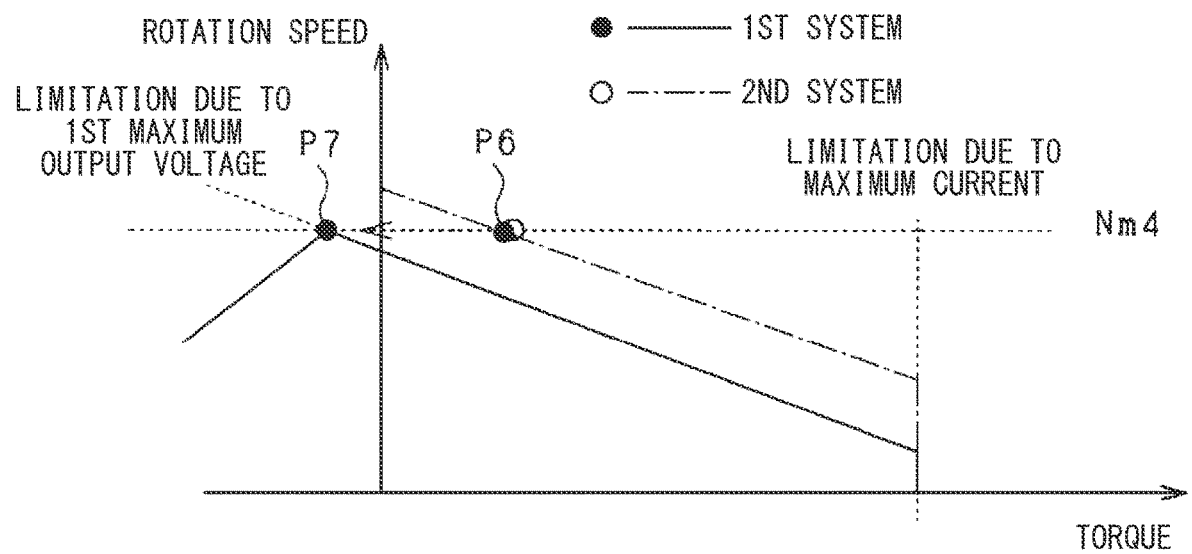
FIG. 11 is a graph showing a change in the relationship between the maximum torque and the maximum rotation speed when the first q-axis current command is reduced to become negative.

FIG. 11 is a graph showing a change in the relationship between the maximum torque and the maximum rotation speed when the positive first q-axis current command Iq1* is reduced to be negative. In a state where the rotation speed of the motor 10 is defined as the rotation speed Nm4, the torque at the point P6 is commanded in the first system L1 and the second system L2. Here, the positive first q-axis current command Iq1* is reduced to negative. Therefore, in the first system L1, the torque at the point P7 can be output at the rotation speed Nm4, and it is possible to suppress exceeding the limit due to the maximum output voltage. If the sum of the torque at the point P6 and the torque at the point P7 is 0 or more, the torque in the opposite direction is not generated.

Figure 12:
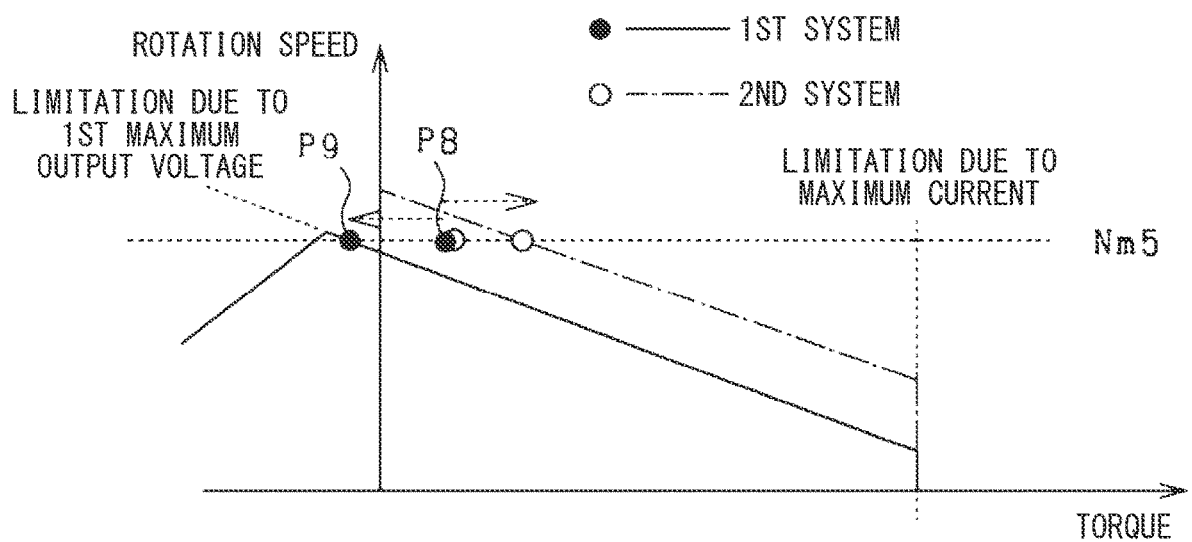
FIG. 12 is a graph showing a change in the relationship between the maximum torque and the maximum rotation speed when the first q-axis current command is reduced and the second q axis current command is increased.

FIG. 12 is a graph showing changes in the relationship between the maximum torque and the maximum rotation speed when the first q-axis current command Iq* is decreased and the second q-axis current command Iq2* is increased. In a state where the rotation speed of the motor 10 is defined as the rotation speed Nm5, the torque at the point P8 is commanded in the first system L1 and the second system L2. Here, the first q-axis current command Iq1* is reduced. Therefore, in the first system L1, the torque at the point P9 can be output at the rotation speed Nm5, and it is possible to suppress exceeding the limit due to the maximum output voltage.

Further, the second q-axis current command Iq2* is increased. Therefore, the decrease in the torque of the motor 10 due to the decrease in the first q-axis current command Iq1* can be compensated by the increase in the torque of the motor 10 due to the increase in the second q-axis current command Iq2*. Therefore, it is possible to prevent the torque output by the motor 10 from being reduced below the command value (i.e., 2It*).

As described above, when the first d-axis current command Id1* is corrected so as to reduce the back electromotive force of the first winding set 180, the first d-axis current command Id1* as the first d-axis current Id1 of the first winding set 180 in the above equation (1) becomes negative. In this case, if the first q-axis current command Iq1* as the q-axis current Iq1 of the first winding set 180 is positive, both the value of "R×Id1" and the value of "(−ω×L×Iq1)" become negative, and there is a possibility such that the absolute value of the d-axis voltage Vd1 of the first winding set 180 may be large.

In this respect, the first control unit 170 calculates the first correction voltage based on the first correction q-axis current command obtained by correcting the first q-axis current command Iq1* so that it has a positive/negative sign opposite to the positive/negative sign of the command value It* and the first correction d-axis current command when the first request voltage is higher than the first upper limit voltage. Therefore, since the value of "R×Id1" can be made negative and the value of "(−ω×L×Iq1)" can be made positive, the absolute value of the d-axis voltage Vd1 of the first winding set 180 can be reduced, and eventually the first correction voltage can be lowered. Further, by setting Iq1 to have a different sign from the rotation speed, the current flows from the motor toward the power supply, and the input voltage of the inverter with respect to the power supply becomes large due to the wiring resistance or the like, and the maximum output voltage becomes large.

Third Embodiment

A third embodiment will be described below with reference to the drawings mainly in terms of differences from the first and second embodiments.

In the present embodiment, the first power supply 191 and the second power supply 291 are both lead batteries having a rated voltage of 12 [V] and are not connected to each other. Then, whichever of the first maximum output voltage Vm1 of the first inverter 120 and the second maximum output voltage Vm2 of the second inverter 220 becomes higher or changes. The capacity of the first power supply 191 and the capacity of the second power supply 291 may be the same or different.

Figure 13:
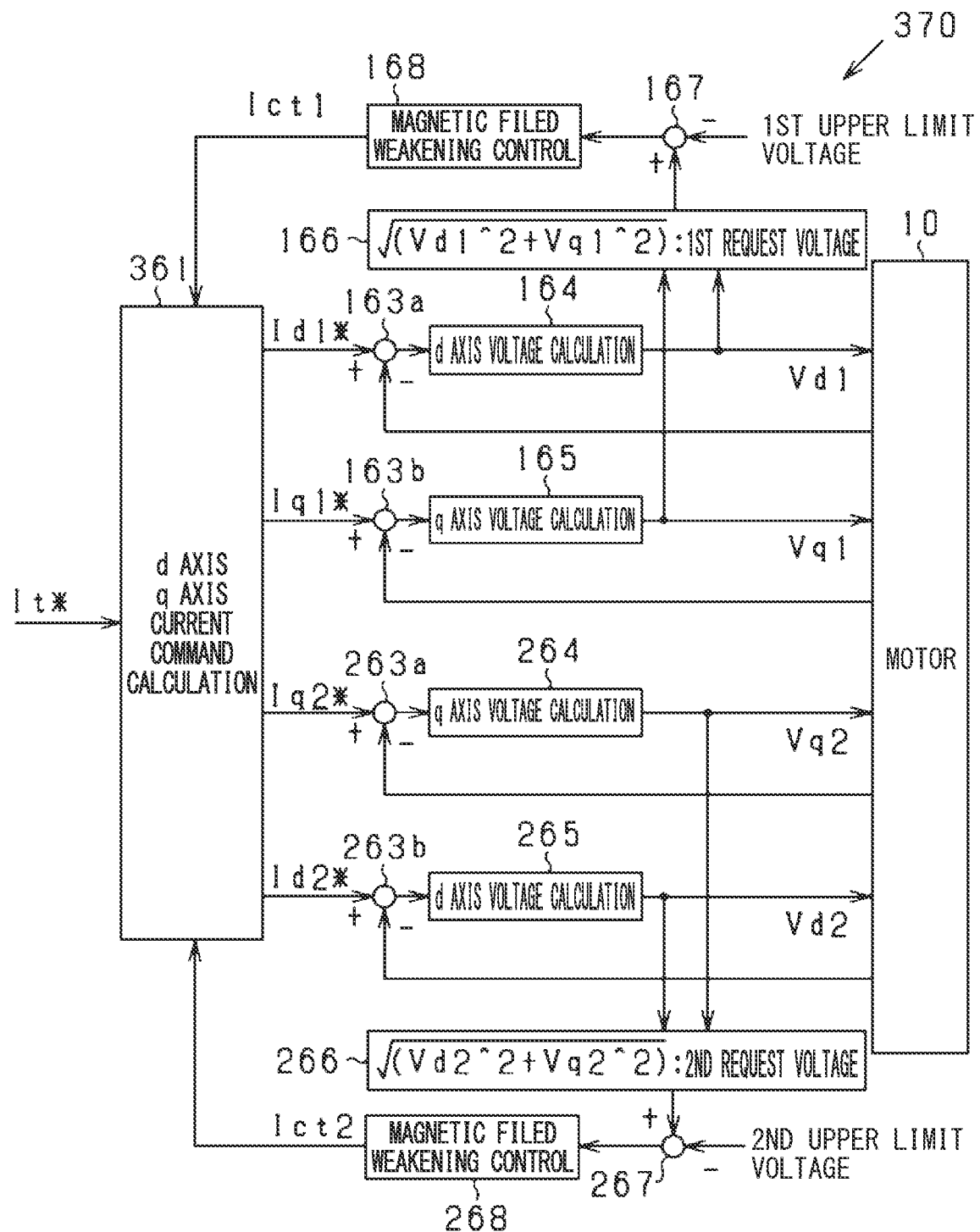
FIG. 13 is a block diagram illustrating a control unit according to the third embodiment.

FIG. 13 is a block diagram showing a control unit 370 of the present embodiment. In the present embodiment, the motor control device 80 includes a control unit 370 in place of the first control unit 170 and the second control unit 270 in FIG. 3. The control unit 370 includes d-axis q-axis current command calculation unit 361 in place of the d-axis current command calculation unit 161, the q-axis current command calculation unit 162, the d-axis current command calculation unit 262, and the q-axis current command calculation unit 261 in FIG. 3. The control unit 370 may have a microcomputer in each of the system 1 and the system 2, and the control unit 370 may have one microcomputer.

Figure 14:
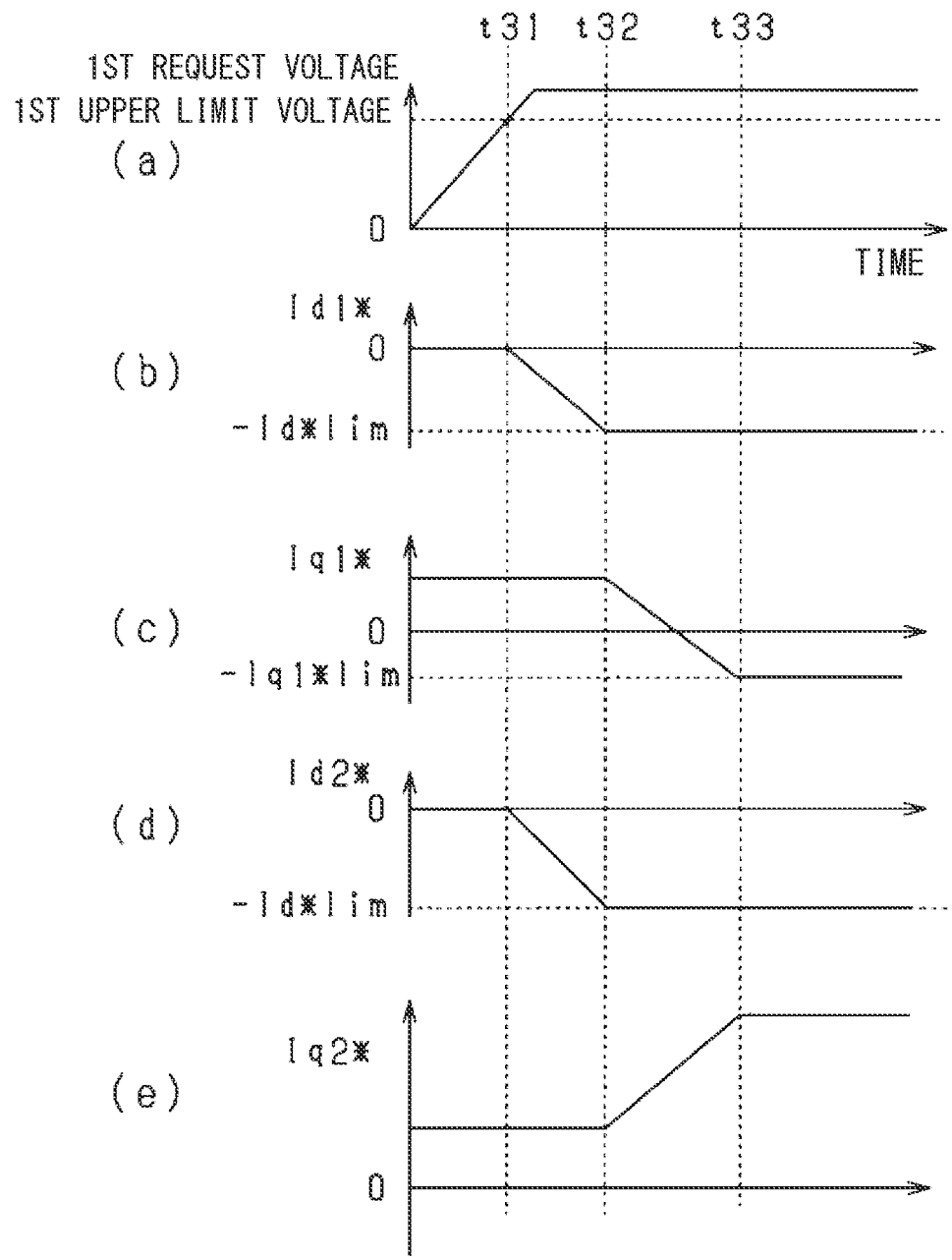
FIG. 14 is a time chart showing a first request voltage and each current command of the third embodiment.

The field weakening control unit 168 and the field weakening control unit 268 calculate the excess integrated values Ict1 and Ict2, respectively. The d-axis q-axis current command calculation unit 361 lowers the first d-axis current command Id1* and the second d-axis current command Id2* below 0 based on the larger one of the excess integrated value Ict1 and the excess integrated value Ict2, and increases the first d-axis current command Id1* and the second d-axis current command Id2* in the negative direction until the request voltage is equal to or lower than the upper limit voltage or reaches the lower limit value. That is, as shown in (a) and (b) of FIG. 14, at times t31 to t32, the d-axis q-axis current command calculation unit 361 calculates the first d-axis current command Id1* so as to reduce the back electromotive force of the first winding set 180 and the second d-axis current command Id2* so as to reduce the back electromotive force of the second winding set 280, according to the larger one of the integrated value of a first voltage excess amount (that is obtained by subtracting the first request voltage from the first upper limit voltage) in which the first request voltage exceeds the first upper limit voltage and the integrated value of a second voltage excess amount (that is obtained by subtracting the second request voltage from the second upper limit voltage) in which the second request voltage exceeds the second upper limit voltage. In FIG. 14, in order to show a sequence that the first d-axis current command Id1* and the second d-axis current command Id2* are increased in the negative direction, and then the first q-axis current command Iq1* is decreased, an example of a waveform in an operation pattern in which the first request voltage exceeds the first upper limit voltage and reaches the maximum output voltage is shown even if the first d-axis current command Id1* and the second d-axis current command Id2* are the lower limits, and the first q-axis current command Iq1* is 0 A.

After the time t32 when the first corrected d-axis current command reaches the d-axis limit value (−Id*lim), the correction (or the control) of the first q-axis current command Iq1* and the second q-axis current command Iq2* in FIG. 14 is performed as the same as the correction (or the control) of the first q-axis current command Iq1* and the second q-axis current command Iq2* after the time t22 in FIG. 9. Note that FIG. 14 shows a waveform on the assumption that the second request voltage does not exceed the second upper limit voltage.

Figure 15:
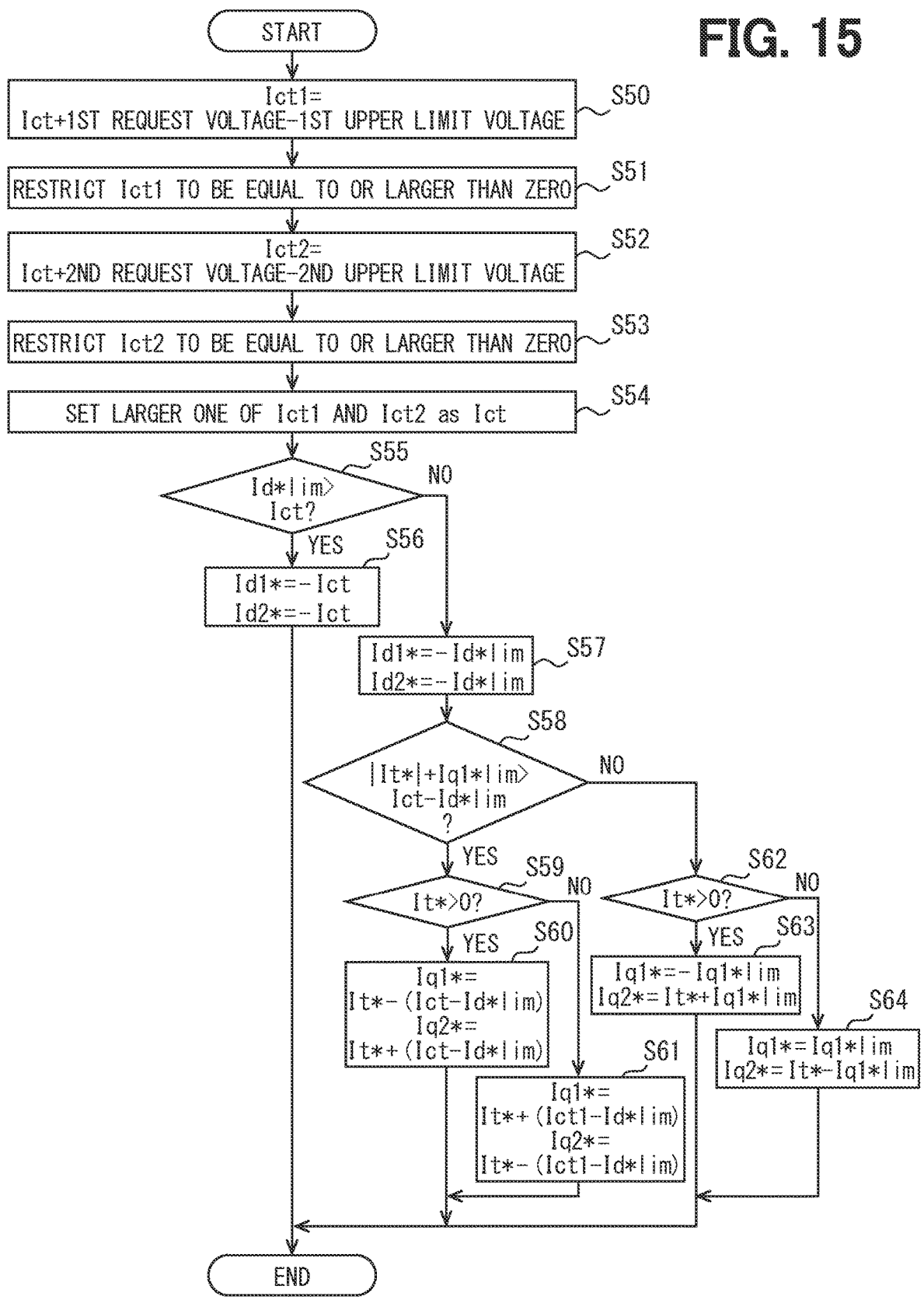
FIG. 15 is a flowchart showing the control of the control unit of the third embodiment.

FIG. 15 is a flowchart showing a control procedure for correcting the current commands Id1*, Iq1*, Id2* and Iq2* as shown in FIG. 14. This series of processes is repeatedly executed by the control unit 370 at a predetermined cycle.

First, the excess integrated value Ict is set to a value calculated by adding the previous excess integrated value Ict1 and the first voltage excess amount (that is, "the first request voltage minus the first upper limit voltage") by which the first request voltage exceeds the first upper limit voltage (at S50). The excess integrated value Ict1 is limited to 0 or more (at S51). Specifically, when the excess integrated value Ict1 is positive, the excess integrated value Ict1 is not changed, and when the excess integrated value Ict1 is negative, the excess integrated value Ict2 is set to be 0.

Nest, the excess integrated value Ict2 is set to a value calculated by adding the previous excess integrated value Ict2 and the second voltage excess amount (that is, "the second request voltage minus the second upper limit voltage") by which the second request voltage exceeds the second upper limit voltage (at S52). That is, the excess integrated value Ict2 is an integrated value of the second voltage excess amount in which the second request voltage exceeds the second upper limit voltage. The excess integrated value Ict2 is limited to 0 or more (at S53). Specifically, when the excess integrated value Ict2 is positive, the excess integrated value Ict2 is not changed, and when the excess integrated value Ict2 is negative, the excess integrated value Ict2 is set to be 0. When the second request voltage is lower than the second upper limit voltage, the second voltage excess amount becomes negative.

The larger one of the excess integrated value Ict1 and the excess integrated value Ict2 is defined as the excess integrated value Ict (at S54).

Subsequently, it is determined whether or not the excess integrated value Ict is smaller than Id*lim (at S55). Id*lim is an absolute value of the d-axis limit value (i.e., −Id*lim). In this determination, when it is determined that the excess integrated value Ict is smaller than Id*lim ("YES" at S55), the first d-axis current command Id1* and the second d-axis current command Id2* is set to be (−Ict), that is, negative. As a result, the larger the first voltage excess amount and the second voltage excess amount, the lower the first d-axis current command Id1* and the second d-axis current command Id2*, and thus the first correction voltage and the second correction voltage are calculated. In addition, the larger the excess integrated value Ict, the lower the first d-axis current command Id1* and the second d-axis current command Id2*, and thus the first correction voltage and the second correction voltage are calculated.

On the other hand, when it is determined in the determination of S55 that the excess integrated value Ict is not smaller than Id*lim ("NO" at S55), the first d-axis current command Id1* and the second d-axis current command Id2* are set as the d-axis limit value (i.e., −Id*lim).

The processing of S58 to S61 is the same as a case where the excess integrated value Ict1 is replaced with the excess integrated value Ict, and the first d-axis limit value (−Id1*lim) is replaced with the d-axis limit value (−Id*lim) in the processing of S35 to S38 of FIG. 10.

The processing at S62 to S64 is the same as the processing at S39 to S41 in FIG. 10. Then, the series of processing described above is terminated (END).

The processing of S50 and S52 corresponds to the processing of the voltage deviation calculation unit 167 and the field weakening control unit 168, and the processing of S51, S53 and S54 corresponds to the processing of the voltage deviation calculation unit 267 and the field weakening control unit 268. The processing from S55 to S63 corresponds to the processing as the d-axis q-axis current command calculation unit 361.

According to the present embodiment, the first d-axis current command Id1* and the second d-axis current command id2* are corrected so as to reduce the back electromotive force of the first winding set 180 and the second winding set 280 based on both Ict 11 and Ict 2. That is, by making the first d-axis current command Id1* and the second d-axis current command Id2* negative in the above equation (2), the q-axis voltage Vq1 of the first winding set 180 and the q-axis voltage Vq2 of the second winding set 280 can be reduced. Further, the first d-axis current command Id1* and the second d-axis current command Id2* are corrected based on the larger one of the integrated value of the first voltage excess amount in which the first upper limit voltage exceeds the first request voltage and the integrated value of the second voltage excess amount in which the second upper limit voltage exceeds the second request voltage. Since the first axis current command Id1* and the second axis current command Id2* are increased in the negative direction at the same time, it is possible to prevent the request voltage from becoming higher than the maximum output voltages Vm1 and Vm2 using the relatively simple processing while avoiding the torque decrease due to the decrease of the first q axis current command Iq1* as much as possible.

Fourth Embodiment

A fourth embodiment will be described below with reference to the drawings mainly in terms of differences from the first and second embodiments. In the present embodiment, the configurations of the first control unit 170 and the second control unit 270 are the same as those in FIG. 3.

In the motor 10, the first winding set 180 and the second winding set 280 are distribution-wound. Therefore, if the total of the first correction d-axis current command obtained by correcting the first d-axis current command Id1* so as to reduce the back electromotive force of the first winding set 180 and the second correction d-axis current command obtained by correcting the second d-axis current command Id2* so as to reduce the back electromotive force of the second winding set 280 becomes excessive, the permanent magnet of the motor 10 may be demagnetized.

In this respect, the first control unit 170
calculates the first correction d-axis current command so that the sum of the first corrected d-axis current command and the second corrected d-axis current command is equal to or lower than the d-axis correction amount Id*lim (i.e., the predetermined d-axis correction amount).

Figure 16:
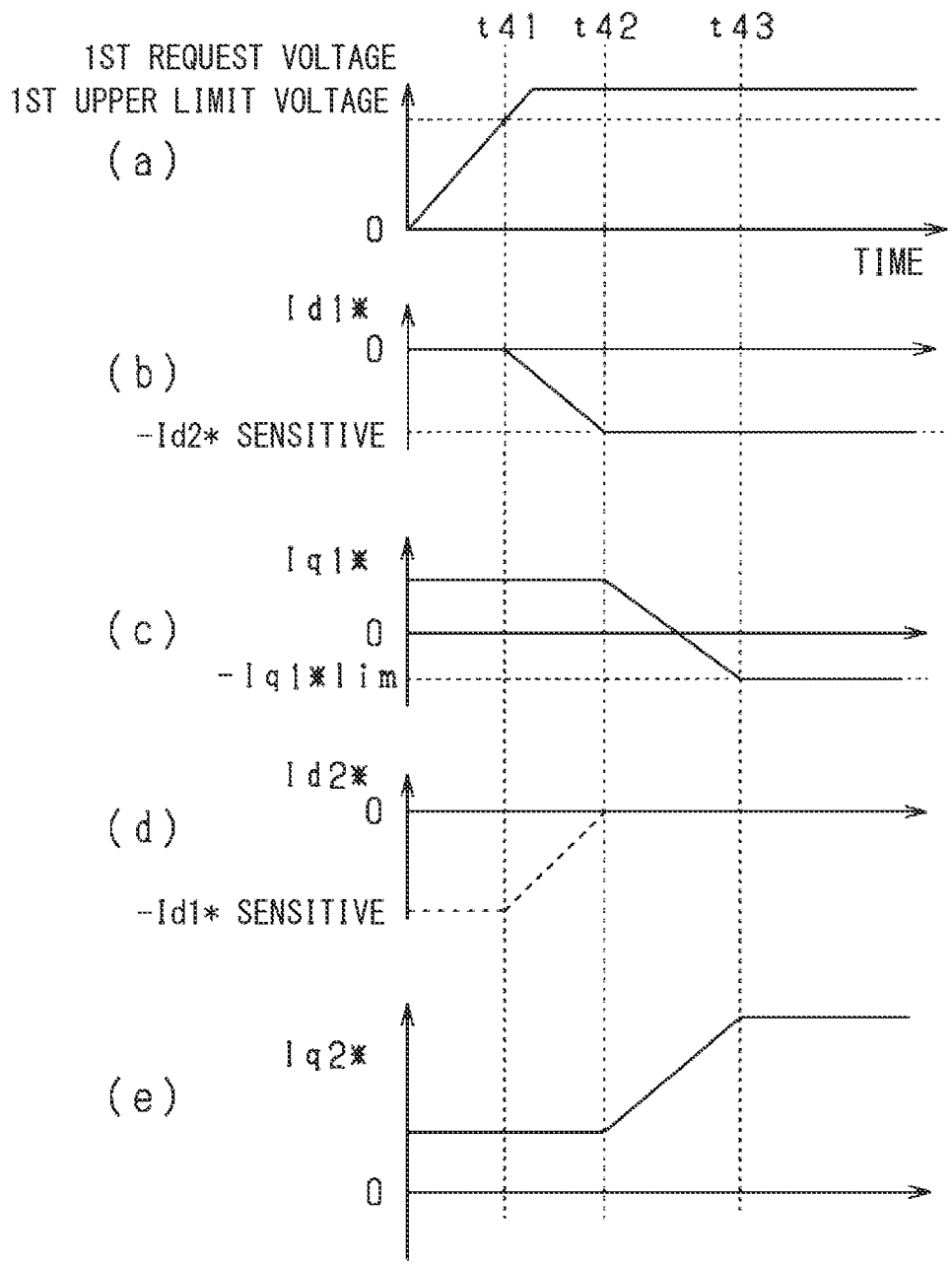
FIG. 16 is a time chart showing a first request voltage and each current command of the fourth embodiment.

FIG. 16 is a time chart showing the first request voltage and each current command.

As shown in (a) and (b) of FIG. 16, when the first request voltage of the first control unit 170 is higher than the first upper limit voltage (at time t41 to t42), the first control unit 170 increases the first d-axis current command Id1* in the negative direction until the request voltage is equal to or lower than the upper limit voltage or reaches the lower limit. At this time, as shown in (d) of FIG. 16, the second d-axis limit value (i.e., −Id1*lim sensitive) as a room for reducing the second d-axis current command Id2* is increased only by the amount for lowering the first d-axis current command Id1*. That is, the room for increasing the second correction d-axis current command in the negative direction is decreased only by the increase amount of the first correction d-axis current command in the negative direction. When the second correction d-axis current command is increased in the negative direction, the room for increasing the first correction d-axis current command in the negative direction is reduced by the amount that the second correction d-axis current command is increased in the negative direction.

After the time t42 when the first correction d-axis current command reaches the second d-axis limit value (i.e., −Id*lim sensitive), the correction (or the control) of the first q-axis current command Iq1* and the second q-axis current command Iq2* in FIG. 16 is performed as the same as the correction (or the control) of the first q-axis current command Iq1* and the second q-axis current command Iq2* after the time t22 in FIG. 9.

Figure 17:
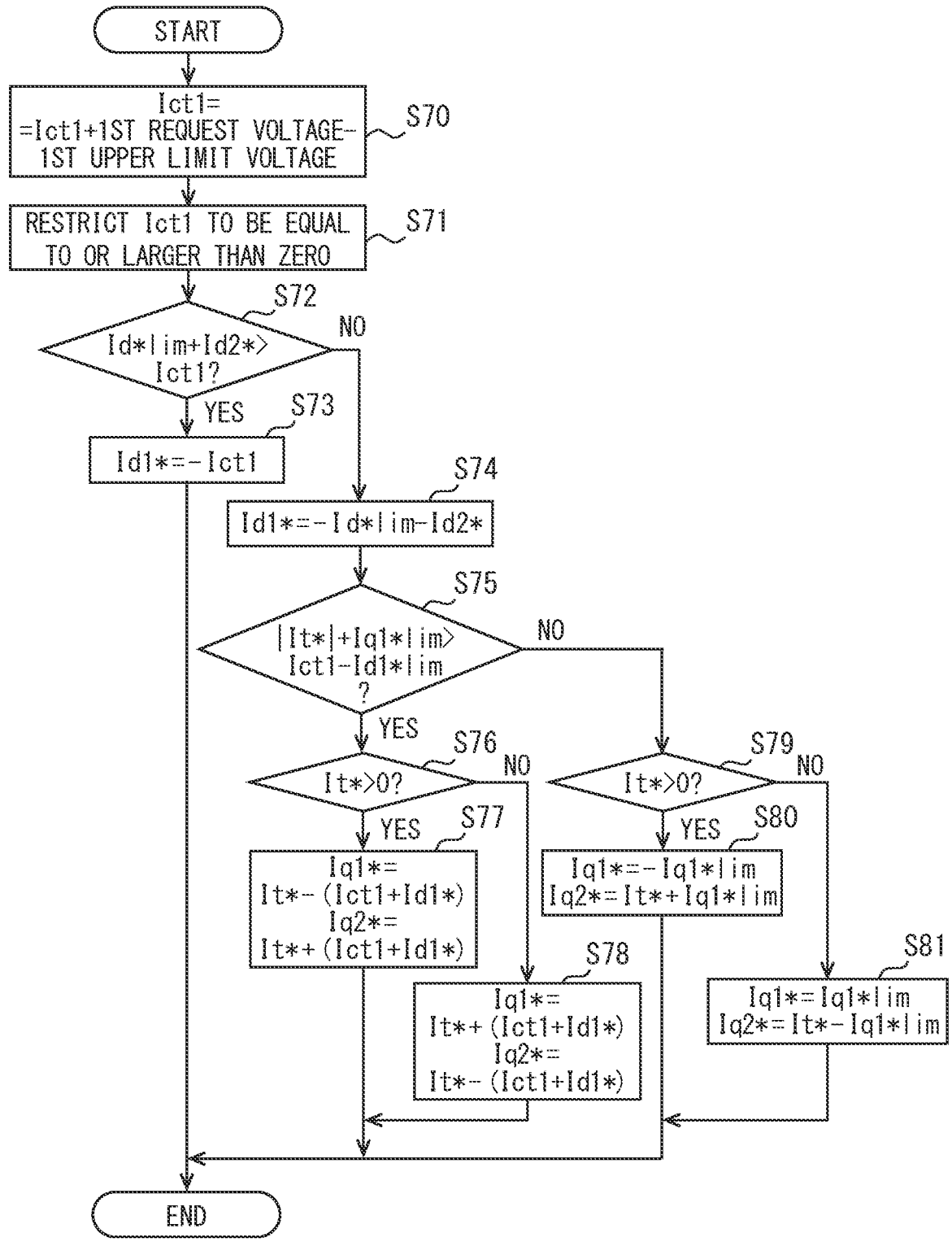
FIG. 17 is a flowchart showing the control of the first control unit and the second control unit of the fourth embodiment.

FIG. 17 is a flowchart showing a control procedure for correcting the current commands Id1*, Iq1*, Id2* and Iq2* as shown in FIG. 16. This series of processes is repeatedly executed by the first control unit 170 and the second control unit 270 at a predetermined cycle.

The processing at S70 and S71 is the same as the processing at S10 and S11 in FIG. 5.

Subsequently, it is determined whether or not the excess integrated value Ict1 is smaller than (Id*lim+Id2*) (at S72). Id*lim is an absolute value of the d-axis limit value (i.e., −Id*lim sensitive). In this determination, when it is determined that the excess integrated value Ict1 is smaller than (Id1*lim+Id2*) ("YES" at S72), the first d-axis current command Id1* is set to be (−Ict1). In this embodiment, the lower limit value of the first correction d-axis current command is changeable according to the magnitude of the second correction d-axis current command by determining with the value obtained by adding the d-axis limit value (i.e., −Id*lim) and Id2*. Alternatively, other operations may be used as long as the sum of the first correction d-axis current command and the second correction d-axis current command can be limited to a predetermined value in the negative direction.

On the other hand, when it is determined in the determination of S72 that the excess integrated value Ict1 is not smaller than (Id1*lim+Id2*) ("NO" at S12), the first d-axis current command Id1* is set as the value of (−Id1*lim−Id2*). That is, in order to keep the total of the first d-axis correction amount and the second d-axis correction amount equal to or lower than the d-axis correction amount Id*lim, the first d-axis current command Id1* is set to the value obtained by subtracting the second axis current command Id2* from the d-axis limit value (i.e., −Id*lim sensitive).

Subsequently, it is determined whether or not Iq1*lim is larger than (Ict1−Id1*lim) (at S75). That is, it is determined whether or not there is room for reducing the first q-axis current command Iq1* by an amount that the excess integrated value Ict1 cannot be reduced by the first d-axis current command Id1*. In this determination, when it is determined that Iq1*lim is larger than the value of "Ict1−Id1*lim" ("YES" at S75), it is determined whether or not the command value It* is larger than 0 (at S76).

When it is determined in the determination of S76 that the command value It* is larger than 0 ("YES" at S76), the first q-axis current command Iq1* is set as the value obtained by subtracting (Ict1+Id1*) from the command value It*, and the second q-axis current command Iq2* is set to the value obtained by adding the command value It* to (Ict1+Id1*) (at S77). On the other hand, when it is determined in the determination of S76 that the command value It* is not larger than 0 ("NO" at S76), the first q-axis current command Iq1* is set to a value obtained by adding the command value It* and the value of (Ict1+Id1*), and the second q-axis current command Iq2* is set to the value obtained by subtracting the value of (Ict1+Id1*) from the command value It* (at S78). Then, the series of processing described above is terminated (END).

The processing at S79 to S81 is the same as the processing at S39 to S41 in FIG. 10. Then, the series of processing described above is terminated (END).

According to the present embodiment, the first winding set 180 and the second winding set 280 are distribution-wound, and the first control unit 170 calculates the first correction d-axis current command so that the total of the first correction d-axis current command obtained by correcting the first d-axis current command Id1* so as to reduce the back electromotive force of the first winding set 180 and the second correction d-axis current command obtained by correcting the second d-axis current command Id2* so as to reduce the back electromotive force of the second winding set 280 is equal to or lower than the d-axis correction amount Id*lim (i.e., the predetermined d-axis correction amount). Therefore, the total of the first correction d-axis current command and the second correction d-axis current command can be kept within the d-axis correction amount Id*lim, and the permanent magnet of the motor 10 can be suppressed from being demagnetized.

Fifth Embodiment

A fifth embodiment will be described below with reference to the drawings mainly in terms of differences from the fourth embodiment.

Figure 18:
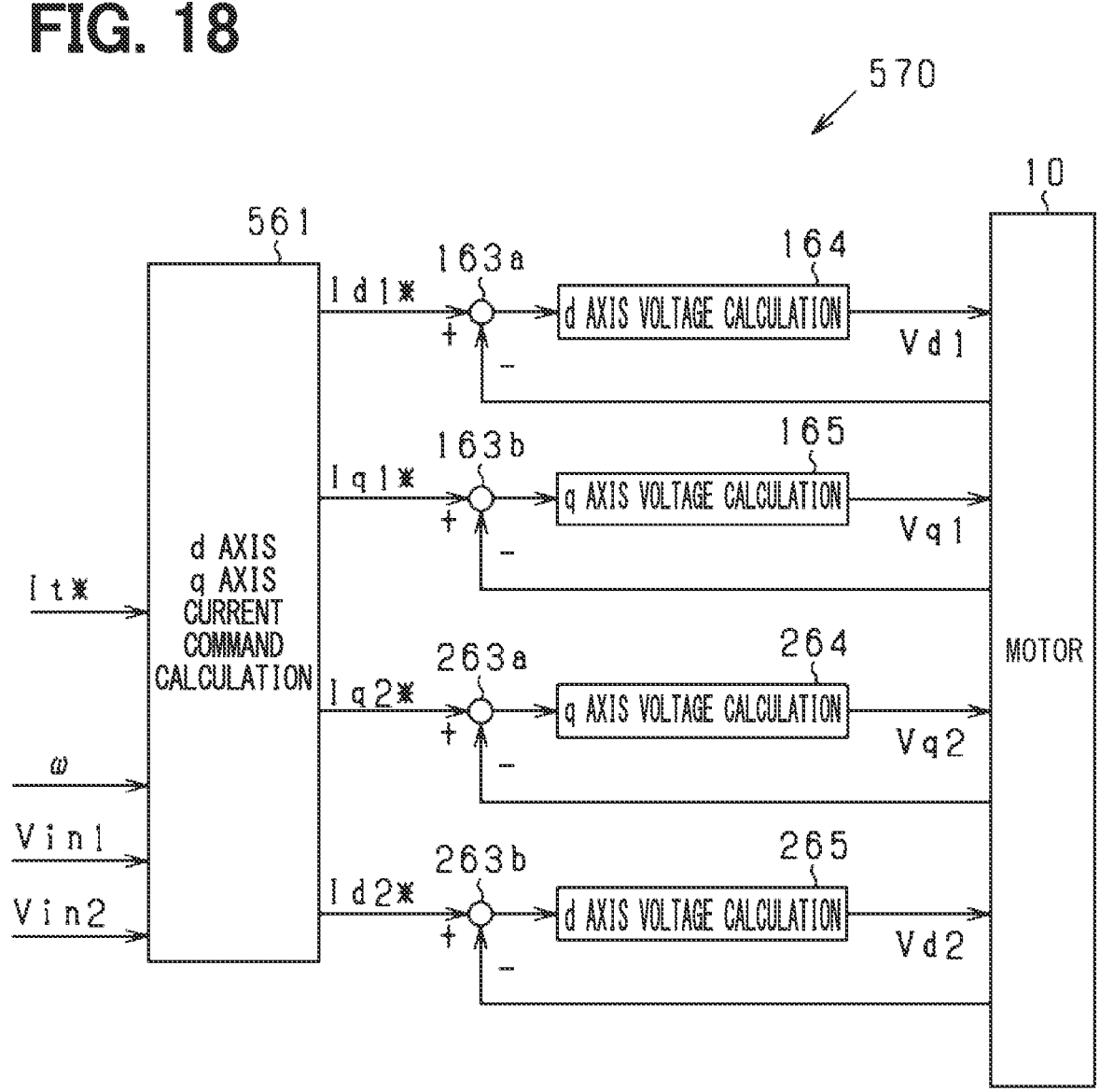
FIG. 18 is a block diagram illustrating a control unit according to the fifth embodiment.

FIG. 18 is a block diagram showing a control unit 570 of the present embodiment. In the present embodiment, the motor control device 80 includes a control unit 570 instead of the control unit 370 of FIG. 13. The control unit 570 includes a d-axis q-axis current command calculation unit 561, and does not include the request voltage calculation units 166, 266, the voltage deviation calculation units 167, 267, and the field weakening control units 168, 268 in FIG. 13.

The d-axis q-axis current command calculation unit 561 includes a map M that defines the relationship between the input voltages Vin1 and Vin2, the angular speed ω of the motor 10, and the torque command value It*, the first d-axis current command Id1*, the first q-axis current command Iq1*, the second d-axis current command Id2* and the second q-axis current command Iq2*. Then, the d-axis q-axis current command calculation unit 561 calculates the current commands Id1*, Iq1*, Id2*, and Iq2* based on the map M and the input voltages Vin1 and Vin2 detected by the voltage detection units 140 and 240, the angular velocity ω of the motor 10 detected by the rotation angle sensor 11, and the command value It* of the torque. Then, in the map M, for example, when the voltage of Vin1 is lower than that of Vin2, the current commands Id1*, Iq1*, Id2*, and Iq2* are calculated to reduce the first q-axis current command Iq1* after the first d-axis current command Id1* and the second d-axis current command Id2* are increased in the negative direction as shown in FIG. 14.

Even with the above configuration, it is possible to exert a function and effect of suppressing the required voltage from becoming larger than the maximum output voltage as in the fourth embodiment.

Sixth Embodiment

A sixth embodiment will be described below with reference to the drawings mainly in terms of differences from the fourth embodiment. In the present embodiment, the configurations of the first control unit 170 and the second control unit 270 are the same as those in FIG. 3.

In the motor 10, the first winding set 180 and the second winding set 280 are distribution-wound. Therefore, even if the first correction d-axis current command exceeds the first d-axis limit value 1 (i.e., −Id*lim1), the second d-axis current command Id2* is corrected so as to increase the back electromotive force of the second winding set 280. Thus, the magnetic flux interlinking with the rotor magnet can be canceled out.

In this regard, in the first control unit 170, when the first correction d-axis current command exceeds the first d-axis limit value 1 (i.e., −Id*lim1), the second d-axis current command Id2* is corrected so as to increase the back electromotive force of the second winding set 280 by the amount of the first d-axis current command excess amount that the first correction d-axis current command exceeds the first d-axis limit value (i.e., −Id*lim1) in the negative direction.

Figure 19:
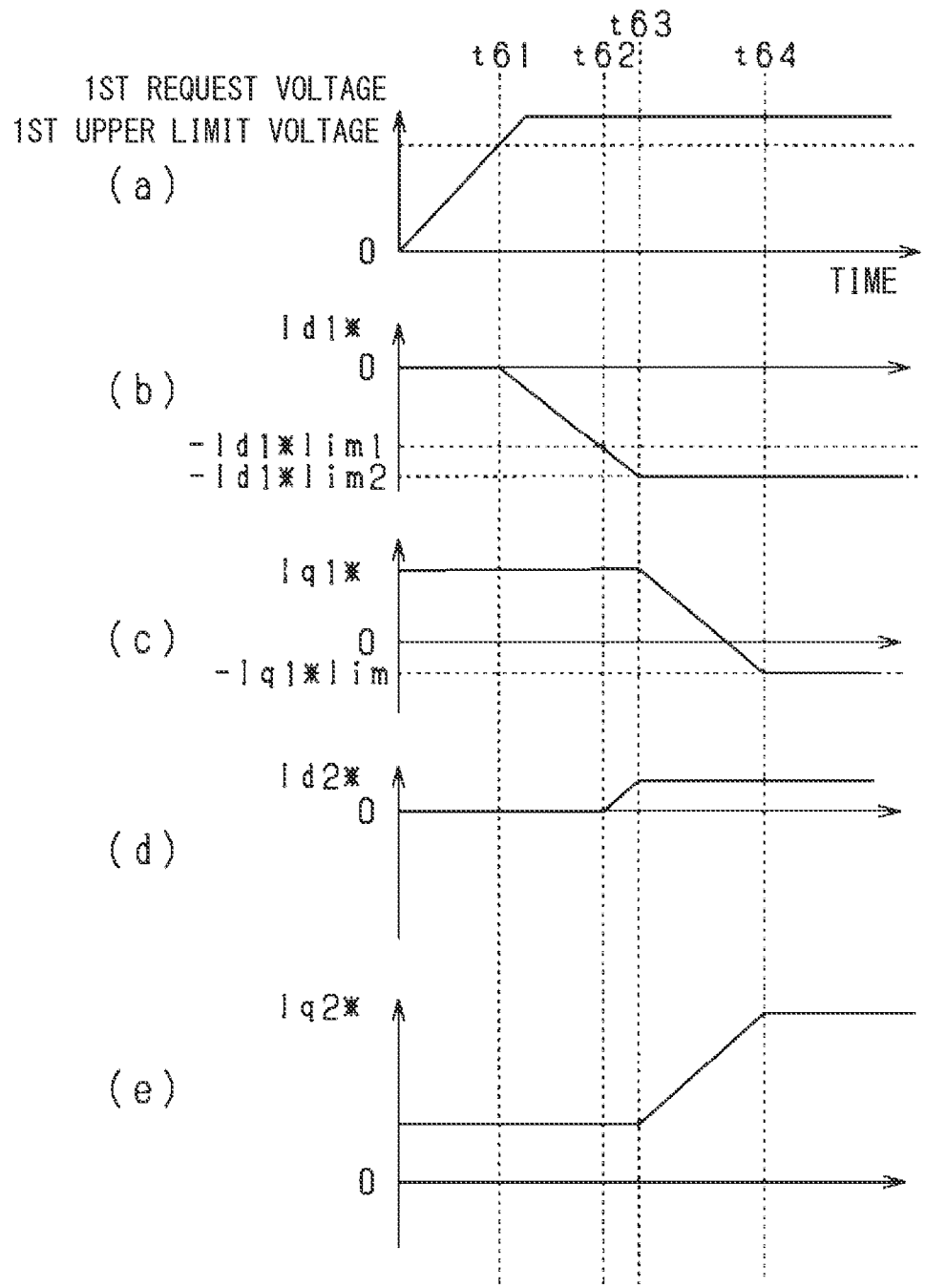
FIG. 19 is a time chart showing a first request voltage and each current command of the sixth embodiment.

FIG. 19 is a time chart showing the first request voltage and each current command. Therefore, as shown in (a) and (b) of FIG. 19, when the first request voltage is higher than the first upper limit voltage (at time t61 to t62), the first control unit 17 decreases the first d-axis current command Id1* from 0, and increases the first d-axis current command Id1* in the negative direction until the request voltage is equal to or lower than the upper limit voltage or reaches the lower limit value.

Then, as shown in (a), (b) and (d) of FIG. 19, when the first correction d-axis current command reaches the first d-axis limit value 1 (i.e., −Id*lim1) (at time t62 to t63), the second d-axis current command Id2* is increased in the positive direction by the amount of the first d-axis current command excess amount in which the first correction d-axis current command exceeds the first d-axis limit value 1 (i.e., −Id*lim1) in the negative direction. That is, in the second control unit 270, when the first correction d-axis current command exceeds the first d-axis limit value 1 (i.e., −Id*lim1) in the negative direction, the second control unit 270 calculates the d-axis voltage Vd2 and the q-axis voltage Vq2 based on the second q-axis current command Iq2* and the second correction d-axis current command which is obtained by correcting the second d-axis current command Id2* so as to increase the back electromotive force of the second winding set 280 by the amount of the first d-axis current command excess amount that the first correction d-axis current command exceeds the first d-axis limit value 1 (i.e., −Id*lim1).

After the time t63 when the first correction d-axis current command reaches the first d-axis limit value 2 (i.e., −Id*lim2), the correction (or the control) of the first q-axis current command Iq1* and the second q-axis current command Iq2* in FIG. 19 is performed as the same as the correction (or the control) of the first q-axis current command Iq1* and the second q-axis current command Iq2* after the time t22 in FIG. 9.

Figure 20:
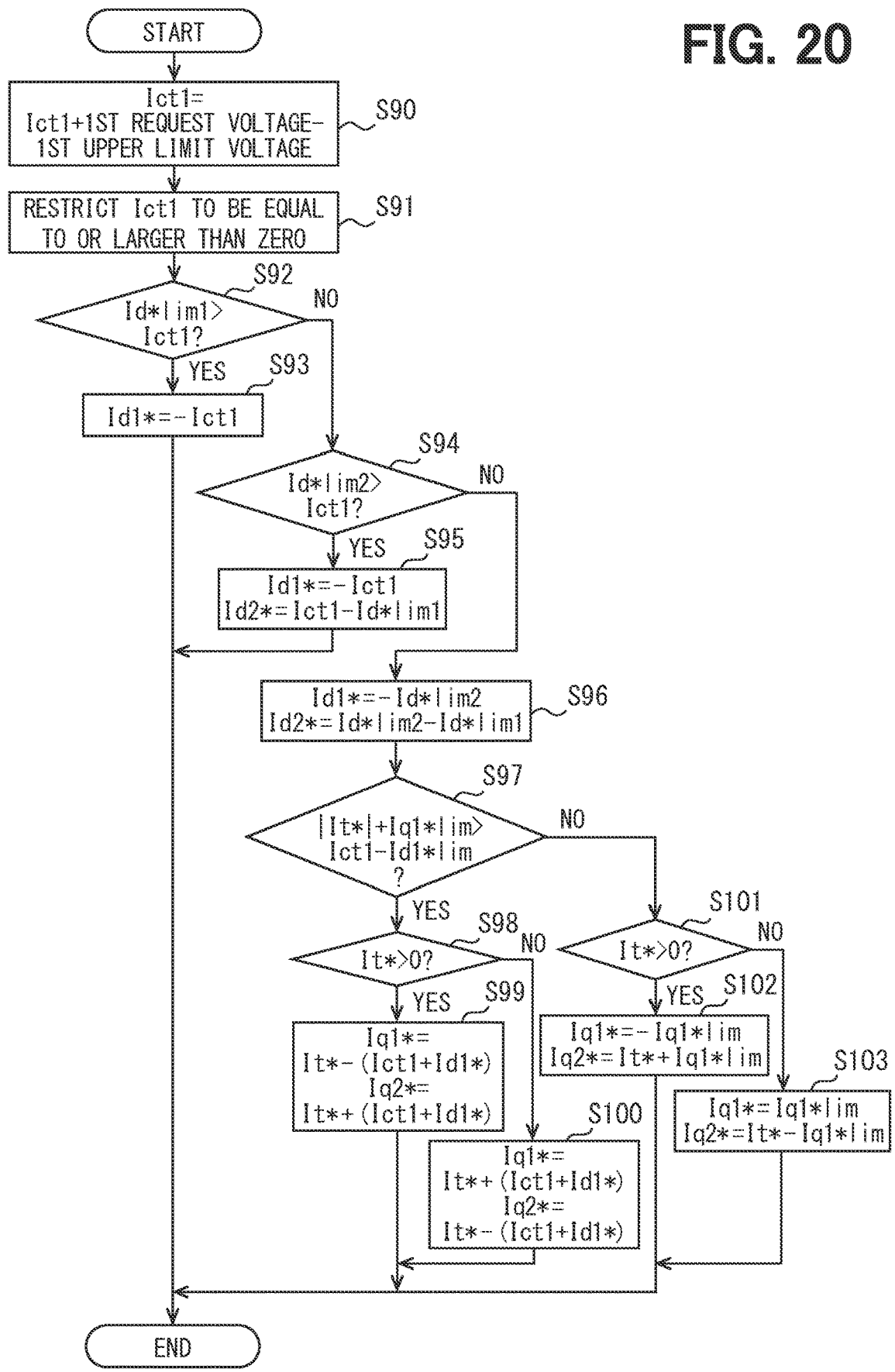
FIG. 20 is a flowchart showing the control of the first control unit and the second control unit of the sixth embodiment.

FIG. 20 is a flowchart showing a control procedure for correcting the current commands Id1*, Iq1*, Id2* and Iq2* as shown in FIG. 19. This series of processes is repeatedly executed by the first control unit 170 and the second control unit 270 at a predetermined cycle.

The processing at S90 and S91 is the same as the processing at S10 and S11 in FIG. 5.

Subsequently, it is determined whether or not the excess integrated value Ict1 is smaller than Id*lim1 (at S92). Id*lim1 is an absolute value of the first d-axis limit value 1 (i.e., −Id*lim1). In this determination, when it is determined that the excess integrated value Ict1 is smaller than Id*lim1 ("YES" at S92), the first d-axis current command Id1* is set to be (−Ict1) (at S93).

On the other hand, in the determination of S92, when it is determined that the excess integrated value Ict1 is not smaller than Id*lim1 ("NO" at S92), it is determined whether or not the excess integrated value Ict1 is smaller than Id*lim2 (at S94). In this determination, when it is determined that the excess integrated value Ict1 is smaller than Id*lim1 ("YES" at S94), the first d-axis current command Id1* is set to (−Ict1), and the second d-axis current command Id2* is set to (Ict1−Id*lim1) (at S95). That is, the second d-axis current command Id2* is corrected by increasing by the amount of the first d-axis excess amount (i.e., Ict1−Id*lim1) in which the first correction d-axis current command exceeds the first d-axis limit value 1 (i.e., −Id*lim1). Then, the series of processing described above is terminated (END).

On the other hand, when it is determined in the determination of S94 that the excess integrated value Ict1 is not smaller than Id*lim2 ("NO" at S94), the first d-axis current command Id1* is set to (−Id*lim2) and the second d-axis current command Id2* is set to (Id*lim2−Id*lim1) (at S96). That is, the first d-axis current command Id1* is limited so as not to be lower than (−Id*lim2).

The processing at S97 to S103 is the same as the processing at S75 to S81 in FIG. 17. Then, the series of processing described above is terminated (END).

According to the present embodiment, when the first correction d-axis current command exceeds the first d-axis limit value 1 (i.e., −Id*lim1) in the negative direction, the first control unit 170 calculates the first correction voltage based on the first correction d-axis current command, the first q-axis current command Iq1* and the second correction d-axis current command obtained by correcting the second d-axis current command Id2* so as to increase the back electromotive force of the second winding set 280 by the amount of the first d-axis current command excess amount that the first correction d-axis current command exceeds the first d-axis limit value 1 (i.e., −Id*lim1) in the negative direction. Therefore, the first d-axis current command excess amount that the first correction d-axis current command exceeds the first d-axis limit value 1 (i.e., −Id*lim1) in the negative direction is canceled by the second correction d-axis current command while lowering the q-axis voltage Vq1 of the first winding set 180.

Other Embodiments

The above embodiments can be modified and implemented as described below. The same structural parts as those of the above embodiments are denoted by the same reference numerals thereby to simplify the description.

Instead of the excess integrated value Ict1, a value obtained by multiplying the first voltage excess amount (i.e., the value obtained by subtracting the first upper limit voltage from the first request voltage) in which the first request voltage exceeds the first upper limit voltage and a predetermined coefficient may be used. Then, PI control may be performed for the deviation between the first request voltage and the first upper limit voltage. Instead of the excess integrated value Ict2, a value obtained by multiplying the second voltage excess amount (i.e, the value obtained by subtracting the second upper limit voltage from the second request voltage) in which the second request voltage exceeds the second upper limit voltage and a predetermined coefficient may be used. Then, PI control may be performed for the deviation between the second request voltage and the second upper limit voltage.

Id1*, Iq1*, Id2* and Iq2* corresponding to the excess amount Ict1 and the excess amount Ict2 are set in a relationship of "1:1", alternatively, as shown in the equations (1) and (2), the weighting of these values may be changed since the influence of Id1*, Iq1*, and Id2*on the voltage are different. This also applies to the following examples.

When the first maximum output voltage Vm1 is lower than the second maximum output voltage Vm2, the first control unit 170 may control the first inverter 120 based on the first correction voltage calculated to be lower than the second required voltage. Therefore, in such a configuration, it is possible to prevent the voltage required in the first inverter 120 from becoming higher than the first maximum output voltage Vm1, and it is possible to suppress that the motor 10 cannot be controlled according to an instruction.

The control units 370 and 570 may calculate the first request voltage and the second request voltage based on the command value It* that commands the torque to be output to the motor 10, and may calculate the first required voltage to be lower than the second required voltage when the first maximum output voltage Vm1 is lower than the second maximum output voltage Vm2, and may control the first inverter 120 based on the first request voltage, and may control the second inverter 220 based on the second request voltage. That is, when the first maximum output voltage Vm1 is lower than the second maximum output voltage Vm2, it may be also possible to control the first inverter 120 and the second inverter 220 so as to reduce the first output voltage, which is the voltage to be output to the first winding set 180 by the first inverter 120. Therefore, in such a configuration, it is possible to prevent the voltage required in the first inverter 120 from becoming higher than the first maximum output voltage Vm1, and it is possible to suppress that the motor 10 cannot be controlled according to an instruction.

Further, the control units 370 and 570 may calculate the first d-axis current command Id1*, the first q-axis current command Iq1*, the second d-axis current command Id2* and the second q-axis current command Iq2* based on the command value It*, may calculate the first request voltage based on the first d-axis current command Id1* and the 1st q-axis current command Iq1*, may calculate the second request voltage based on the second d-axis current command Id2* and the second q-axis current command Iq2*, and may calculate the first q-axis current command Iq1* to be smaller than the second q-axis current command Iq2* when the first maximum output voltage Vm1 is lower than the second maximum output voltage Vm2. According to such a configuration, the first request voltage can be made lower than the second request voltage, and it is possible to prevent the first request voltage from becoming higher than the first maximum output voltage Vm1. Therefore, it is possible to prevent the current from becoming uncontrollable and causing an unintended current to flow in the winding set.

Although it is described that the d-axis voltage calculation units 164, 265 and the q-axis voltage calculation units 165, 264 calculate the voltage of each axis of each system from the current and current command of each axis of each system, respectively, the voltage of each axis may be calculated using the current and current command of other systems or other axes for so-called non-interference control, instead of calculating the voltage of each axis in each system only based on the current and the current command of each axis in each system.

As described above, the q-axis voltage calculation unit 165 performs PI control so that the q-axis deviation ΔIq1 approaches 0, and calculates the q-axis voltage Vq1. The d-axis voltage calculation unit 164 performs PI control so that the d-axis deviation ΔId1 approaches 0, and calculates the d-axis voltage Vd1. The q-axis voltage calculation unit 264 performs PI control so that the q-axis deviation ΔIq2 approaches 0, and calculates the q-axis voltage Vq2. The d-axis voltage calculation unit 265 performs PI control so that the d-axis deviation ΔId2 approaches 0, and calculates the d-axis voltage Vd2. In the calculation of each system, when the excess amount Ict1 of the other system exceeds a predetermined value, the integral calculation of PI control may be stopped or the output voltage may be limited to make it more difficult for the motor to rotate, so that it may be suppressed from exceeding the maximum output voltage.

The rated voltage of the first power supply 191 and the second power supply 291 may not be limited to 12 [V], but may be 48 [V] or the like. Further, the first power supply 191 and the second power supply 291 may not be limited to the lead battery, but may be a lithium ion battery or the like.

As the first output voltage, the actual value (i.e., the detection value) of the voltage output by the first inverter 120 may be adopted instead of the first request voltage.

The first power supply unit and the second power supply unit branched from the common power source may supply power to the first inverter 120 and the second inverter 220, respectively. Even in this case, the first maximum output voltage Vm1 of the first inverter 120 and the second maximum output voltage Vm2 of the second inverter 220 may differ due to differences in wiring resistance and the like.

The steering system 90 may not be limited to the "column assist type" of each of the above embodiments, and may be a "rack assist type" that transmits the rotation of the motor 10 to the rack shaft 97. Further, the steering system 90 may be a so-called "steer-by-wire type" steering system.

The motor 10 may not be limited to distribution winding, and may be centrally wound. The motor 10 may be a motor having four or more phases. The motor 10 may not be limited to a motor (i.e., the IPM motor) in which a permanent magnet (i.e., a magnetic component) is embedded in a rotor, and may be a field type motor having a field winding in the rotor.

The motor control device 80 of each of the above embodiments may be applied not only to the motor 10 of the electric power steering device but also to a motor that generates a driving force for driving an electric vehicle or a hybrid vehicle and a motor that drives an air conditioner.

Although the present disclosure has been described in accordance with the examples, it is understood that the present disclosure is not limited to such examples or structures. The present disclosure incorporates various modifications and variations within the scope of equivalents. In addition, various combinations and forms, and other combinations and forms including only one element, more, or less than them are also included in the scope and concept of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device for controlling a motor including a first winding set and a second winding set, the motor control device comprising:
    a first inverter connected to the first winding set and supplied with electric power from a first power supply unit;
    a second inverter connected to the second winding set and supplied with electric power from a second power supply unit; and
    a control unit that controls the first inverter and the second inverter by differentiating a magnitude of current flowing through the first winding set and a magnitude of current flowing through the second winding set, or by restricting an output voltage of the second inverter, so as to reduce a first output voltage as a voltage to be output from the first inverter to the first winding set when a voltage to be output from the first inverter is higher than a first upper limit voltage determined based on a first maximum output voltage.

2. The motor control device according to claim 1, wherein:
    the control unit includes:
        a first control unit that controls the first inverter based on a first request voltage when the first request voltage, which is a request value of the voltage to be output by the first inverter, is not higher than the first upper limit voltage set based on the first maximum output voltage, and controls the first inverter to reduce the first request voltage when the first request voltage is higher than the first upper limit voltage; and a second control unit that controls the second inverter based on a second request voltage, which is a request value of the voltage to be output by the second inverter.

3. The motor control device according to claim 2, wherein:
the first control unit calculates the first request voltage based on a command value that commands a torque to be output to the motor, controls the first inverter based on the first request voltage when the first request voltage is not higher than the first upper limit voltage set to be equal to or lower than the first maximum output voltage, and controls the first inverter to reduce the first request voltage when the first request voltage is higher than the first upper limit voltage; and
the second control unit calculates the second request voltage, which is the request value of the voltage to be output by the second inverter, based on the command value, and controls the second inverter based on the second request voltage.

4. The motor control device according to claim 3, wherein:
the control unit calculates a first d-axis current command for instructing a command of a d-axis current of the first winding set and a first q-axis current command for instructing a command of a q-axis current of the first winding set based on the command value that instructs a command for the torque to be output to the motor;
the control unit calculates the first request voltage, which is the request value of the voltage to be output by the first inverter, based on the first d-axis current command and the first q-axis current command; and
the control unit controls the first inverter to reduce an absolute value of the first q-axis current command when the first request voltage is higher than the first upper limit voltage.

5. The motor control device according to claim 3, wherein:
the control unit controls the first inverter to reduce the first request voltage as a first voltage excess amount, by which the first request voltage as a request value of the voltage to be output by the first inverter exceeds the first upper limit voltage, becomes larger.

6. The motor control device according to claim 5, wherein:
the control unit controls the first inverter so that the larger an integrated value of the first voltage excess amount is, the lower the first request voltage is.

7. The motor control device according to claim 3, wherein:
the control unit controls the first inverter so as to reduce the first request voltage, which is the request value of the voltage to be output by the first inverter to be lower than the second request voltage, which is the request value of the voltage to be output by the second inverter when the first maximum output voltage is lower than the second maximum output voltage, which is the maximum output voltage that the second inverter outputs to the second winding set.

8. The motor control device according to claim 1, wherein:
the control unit controls the first inverter to reduce a q-axis current of the first winding set when a first request voltage, which is a request value of the voltage to be output by the first inverter, is higher than the first upper limit voltage.

9. The motor control device according to claim 8, wherein:
the control unit calculates a second d-axis current command for instructing a d-axis current of the second winding set and a second q-axis current command for instructing a q-axis current of the second winding set based on the command value that commands the torque to be output to the motor, and controls the second inverter to increase the second q-axis current command based on an amount of decrease in which the q-axis current of the first winding set is reduced.

10. The motor control device according to claim 1, wherein:
the control unit calculates a first d-axis current command for instructing a command of a d-axis current of the first winding set or a first q-axis current command for instructing a command of a q-axis current of the first winding set based on the command value that instructs a command for the torque to be output to the motor;
the control unit calculates the first request voltage, which is the request value of the voltage to be output by the first inverter, based on the first d-axis current command and the first q-axis current command; and
the control unit controls the first inverter to reduce a back electromotive force of the first winding set when the first request voltage is higher than the first upper limit voltage.

11. The motor control device according to claim 10, wherein:
the control unit calculates a second d-axis current command for commanding a d-axis current of the second winding set and a second q-axis current command for commanding a q-axis current of the second winding set based on the command value;
the control unit controls the second inverter to reduce a back electromotive force of the second winding set when the first d-axis current command reaches the first d-axis limit value; and
the control unit controls the first inverter based on the second d-axis current command, the first d-axis limit value, and the first q-axis current command when the first d-axis current command reaches the first d-axis limit value.

12. The motor control device according to claim 10, wherein:
the first winding set and the second winding set are distribution-wound;
the control unit calculates a second d-axis current command for commanding a d-axis current of the second winding set and a second q-axis current command for commanding a q-axis current of the second winding set based on the command value;
the control unit controls the second inverter to increase a back electromotive force of the second winding set by a first d-axis excess amount by which the first d-axis current command exceeds the first d-axis limit value when the first d-axis current command exceeds the first d-axis limit value; and
the control unit controls the first inverter based on the second d-axis current command, the first d-axis current command, and the first q-axis current command when the first d-axis current command exceeds the first d-axis limit value.

13. The motor control device according to claim 10, wherein:
the first winding set and the second winding set are distribution-wound; and
the control unit controls the first inverter to set a sum of a first d-axis correction amount, which is a correction amount for correcting the first d-axis current command so as to reduce the back electromotive force of the first winding set, and a second d-axis correction amount, which is a correction amount for correcting the second d-axis current command so as to reduce the back electromotive force of the second winding set, to be equal to or lower than a predetermined d-axis correction amount.

14. The motor control device according to claim 1, wherein:
the control unit controls the first inverter so as to set a positive and negative sign of the first q-axis current command for instructing the q-axis current of the first winding set to be opposite to a positive and negative sign of the command value that commands the torque to be output to the motor under a condition that the voltage to be output by the first inverter is higher than the first upper limit voltage set based on the first maximum output voltage.

15. The motor control device according to claim 1, wherein:
the control unit calculates the first request voltage, which is a request value of a voltage to be output by the first inverter, and the second request voltage, which is a request value of a voltage to be output by the second inverter, based on the command value which commands a torque to be output to the motor; the control unit calculates the first request voltage to be lower than the second request voltage when the first maximum output voltage is lower than the second maximum output voltage; and
the control unit controls the first inverter based on the first request voltage, and controls the second inverter based on the second request voltage.

16. The motor control device according to claim 15, wherein:
the control unit calculates a first d-axis current command for commanding the d-axis current and a first q-axis current command for commanding the q-axis current in the first winding set according to the command value, and calculates a second d-axis current command for commanding the d-axis current and a second q-axis current command for commanding the q-axis current in the second winding set according to the command value;
the control unit calculates the first request voltage based on the first d-axis current command and the first q-axis current command, and calculates the second request voltage based on the second d-axis current command and the second q-axis current command; and
when the first maximum output voltage is lower than the second maximum output voltage, the control unit calculates the first q-axis current command to be smaller than the second q-axis current command.

17. The motor control device according to claim 16, wherein:
the control unit calculates the first d-axis current command so as to reduce the back electromotive force of the first winding set based on a larger one of: the integrated value of the first voltage excess amount in which the first request voltage exceeds the first upper limit voltage set to be equal to or lower than the first maximum output voltage; and the integrated value of the second voltage excess amount in which the second request voltage exceeds the second upper limit voltage set to be equal to or lower than the second maximum output voltage; and
the control unit calculates the second d-axis current command so as to reduce the back electromotive force of the second winding set.

18. The motor control device according to claim 1, wherein:
limiting the output voltage indicates limiting the output voltage to be equal to or lower than a predetermined absolute value.

19. The motor control device according to claim 1, wherein:
limiting the output voltage indicates stopping an integral operation in a control based on a deviation between the command value and the actual value of the current flowing through the second winding set.

20. A steering system comprising:
the motor control device according to claim 1;
a steering mechanism; and
the motor that drives the steering mechanism.

* * * * *